US012657164B2

(12) United States Patent
Dubey

(10) Patent No.: US 12,657,164 B2
(45) Date of Patent: Jun. 16, 2026

(54) NTFS-FAT32 DUAL FILE SYSTEM IN STORAGE DEVICES AND AUTOMATIC SWITCHING

(71) Applicant: Sandisk Technologies, Inc., Milpitas, CA (US)

(72) Inventor: Sankalp Dubey, Bhopal (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/924,757

(22) Filed: Oct. 23, 2024

(65) Prior Publication Data

US 2026/0111396 A1 Apr. 23, 2026

(51) Int. Cl.
G06F 16/00 (2019.01)
G06F 16/11 (2019.01)
G06F 16/18 (2019.01)
(52) U.S. Cl.
CPC ........ G06F 16/1847 (2019.01); G06F 16/116 (2019.01)
(58) Field of Classification Search
None
See application file for complete search history.

(56) References Cited

U.S. PATENT DOCUMENTS 10,474,396 B2 11/2019 Jain et al.
2023/0325281 A1* 10/2023 Rana ..................... G06F 3/0619
707/652

FOREIGN PATENT DOCUMENTS

| CN | 104200172 A | * 12/2014 | .......... G06F 21/606 |
| CN | 108984422 | 12/2018 | |
| CN | 112231779 | 1/2021 | |
| WO | WO-2011026660 A1 | * 3/2011 | .......... G06F 3/0664 |

* cited by examiner

*Primary Examiner* — Tuankhanh D Phan
(74) *Attorney, Agent, or Firm* — Patterson + Sheridan, LLP

(57) ABSTRACT

A data storage device can include a non-volatile memory and control circuitry configured to: support both a first file system and a second file system to access data stored on the non-volatile memory; determine a file system supported by a host; receive a read request for data from the host; in response to determining that the file system supported by the host is the first file system, access one or more file system tables for the first file system to provide the data for the read request; and in response to determining that the file system supported by the host is the second file system, access one or more file system tables for the second file system to provide the data for the read request.

18 Claims, 14 Drawing Sheets

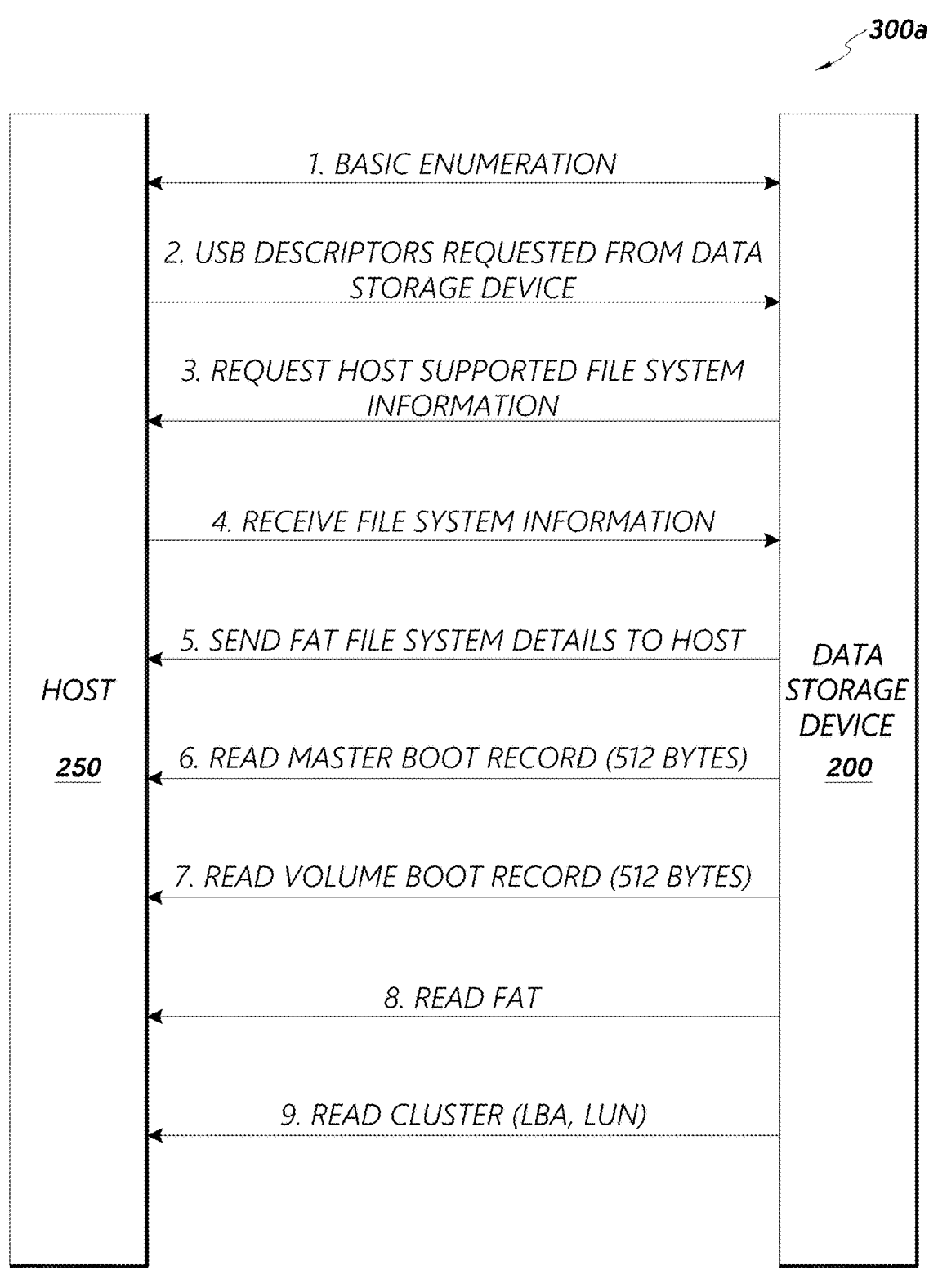
_300a_
_FAT_
_FIG. 3A_

*300b*

*1. BASIC ENUMERATION*

*2. USB DESCRIPTORS REQUESTED FROM DATA STORAGE DEVICE*

*3. REQUEST HOST SUPPORTED FILE SYSTEM INFORMATION*

*4. RECEIVE FILE SYSTEM INFORMATION*

*5. SEND NTFS FILE SYSTEM DETAILS TO HOST*

*6. READ MFT TABLE (1024 BYTES)*

*7. READ CLUSTER INFORMATION*

*8. READ BITMAP INFORMATION*

*HOST*

*250*

*DATA STORAGE DEVICE*

*200*

*NTFS*

*FILE SYSTEM CONVERSION WORKFLOW*

*500*

NEW FILE GENERATION WORKFLOW

600

SWITCHING FILE SYSTEM WORKFLOW

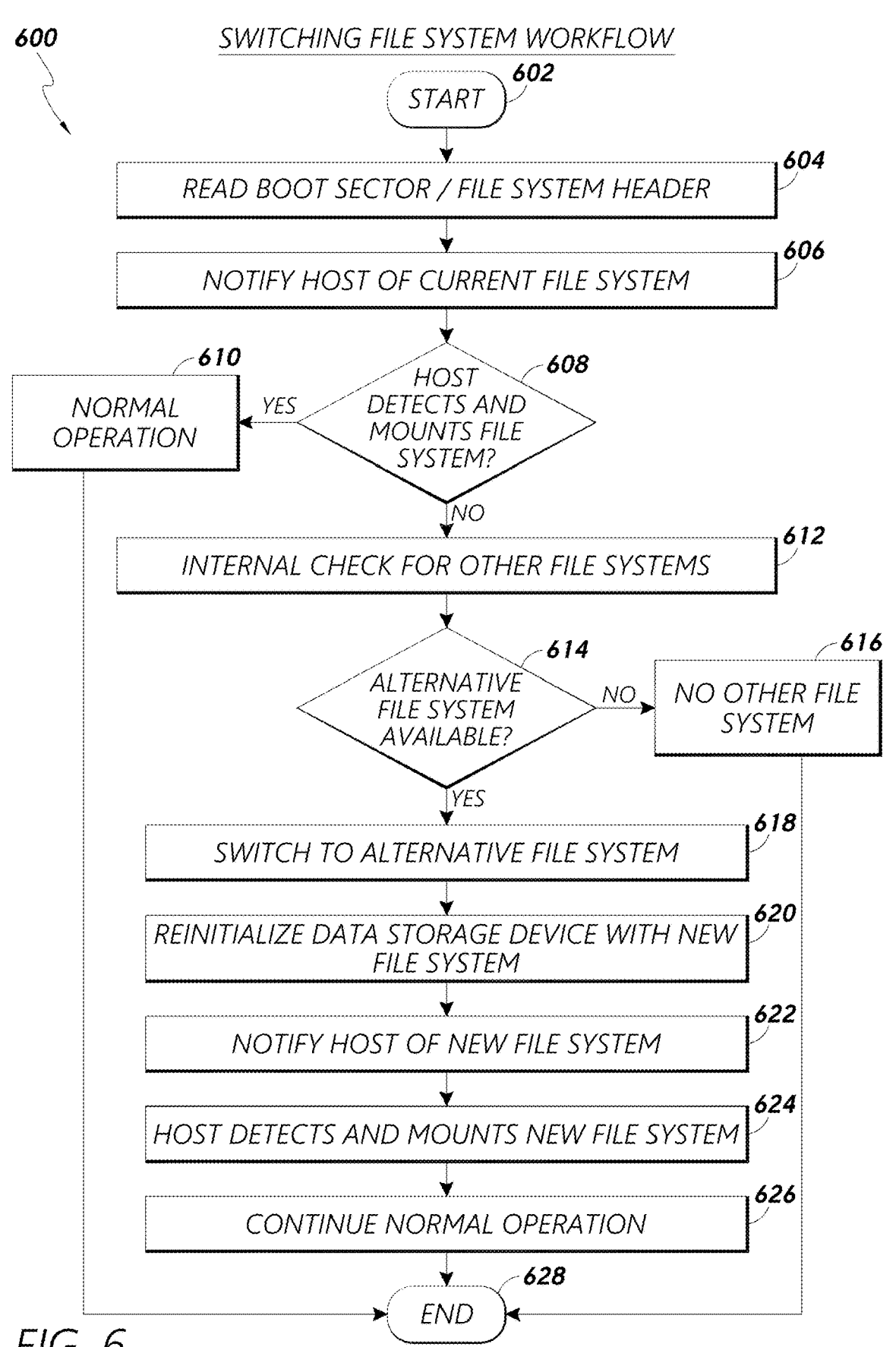

START ~ 602

READ BOOT SECTOR / FILE SYSTEM HEADER ~ 604

NOTIFY HOST OF CURRENT FILE SYSTEM ~ 606

HOST DETECTS AND MOUNTS FILE SYSTEM? ~ 608

NORMAL OPERATION ~ 610

YES

NO

INTERNAL CHECK FOR OTHER FILE SYSTEMS ~ 612

ALTERNATIVE FILE SYSTEM AVAILABLE? ~ 614

NO OTHER FILE SYSTEM ~ 616

NO

YES

SWITCH TO ALTERNATIVE FILE SYSTEM ~ 618

REINITIALIZE DATA STORAGE DEVICE WITH NEW FILE SYSTEM ~ 620

NOTIFY HOST OF NEW FILE SYSTEM ~ 622

HOST DETECTS AND MOUNTS NEW FILE SYSTEM ~ 624

CONTINUE NORMAL OPERATION ~ 626

END ~ 628

Figure 7A:
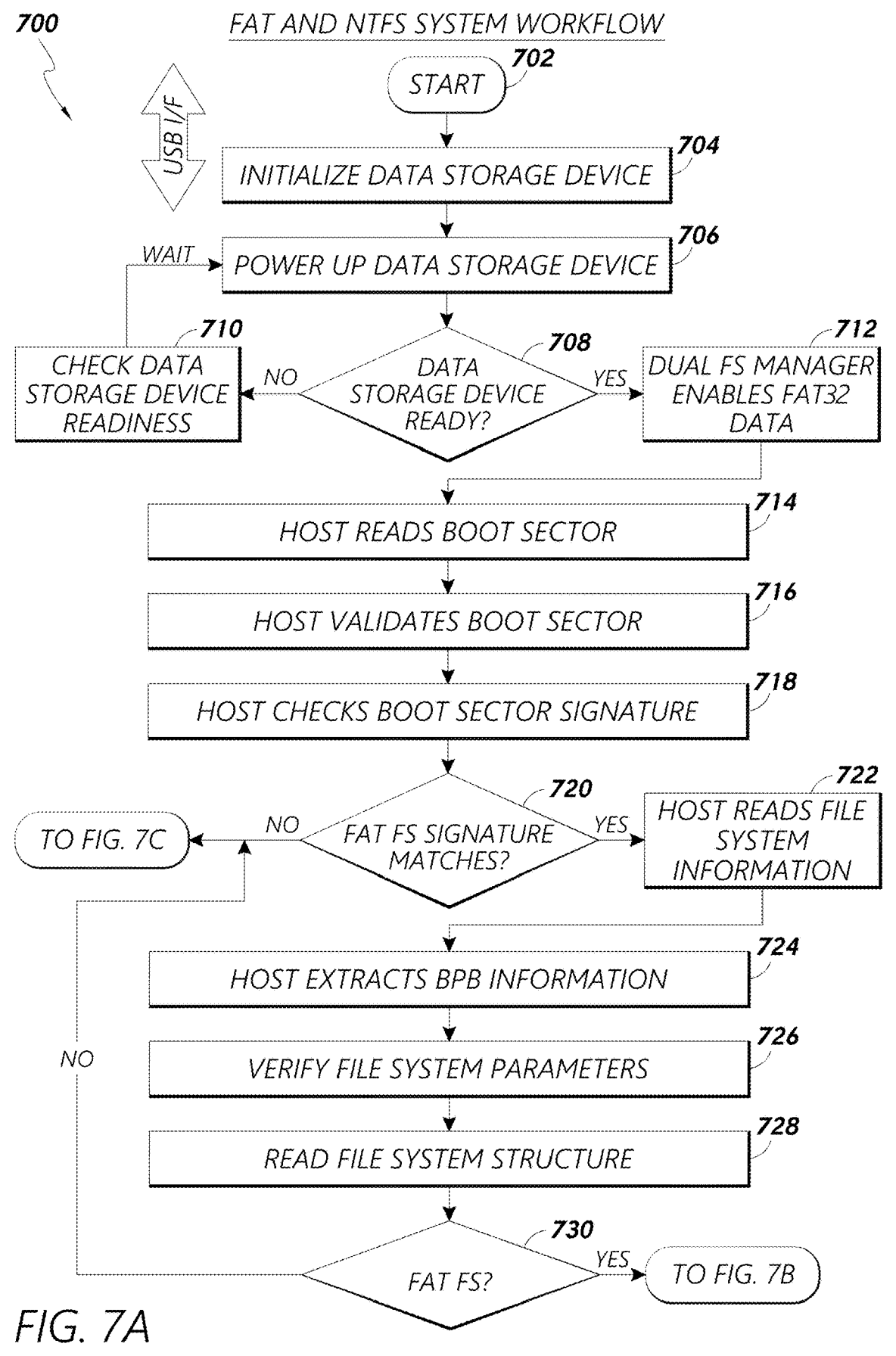

FAT AND NTFS SYSTEM WORKFLOW

*USB I/F*

START *702*

INITIALIZE DATA STORAGE DEVICE *704*

WAIT → POWER UP DATA STORAGE DEVICE *706*

CHECK DATA STORAGE DEVICE READINESS *710* ← NO — DATA STORAGE DEVICE READY? *708* — YES → DUAL FS MANAGER ENABLES FAT32 DATA *712*

HOST READS BOOT SECTOR *714*

HOST VALIDATES BOOT SECTOR *716*

HOST CHECKS BOOT SECTOR SIGNATURE *718*

TO FIG. 7C ← NO — FAT FS SIGNATURE MATCHES? *720* — YES → HOST READS FILE SYSTEM INFORMATION *722*

HOST EXTRACTS BPB INFORMATION *724*

VERIFY FILE SYSTEM PARAMETERS *726*

READ FILE SYSTEM STRUCTURE *728*

NO

FAT FS? *730* — YES → TO FIG. 7B

FAT AND NTFS SYSTEM WORKFLOW

700

FAT AND NTFS SYSTEM WORKFLOW

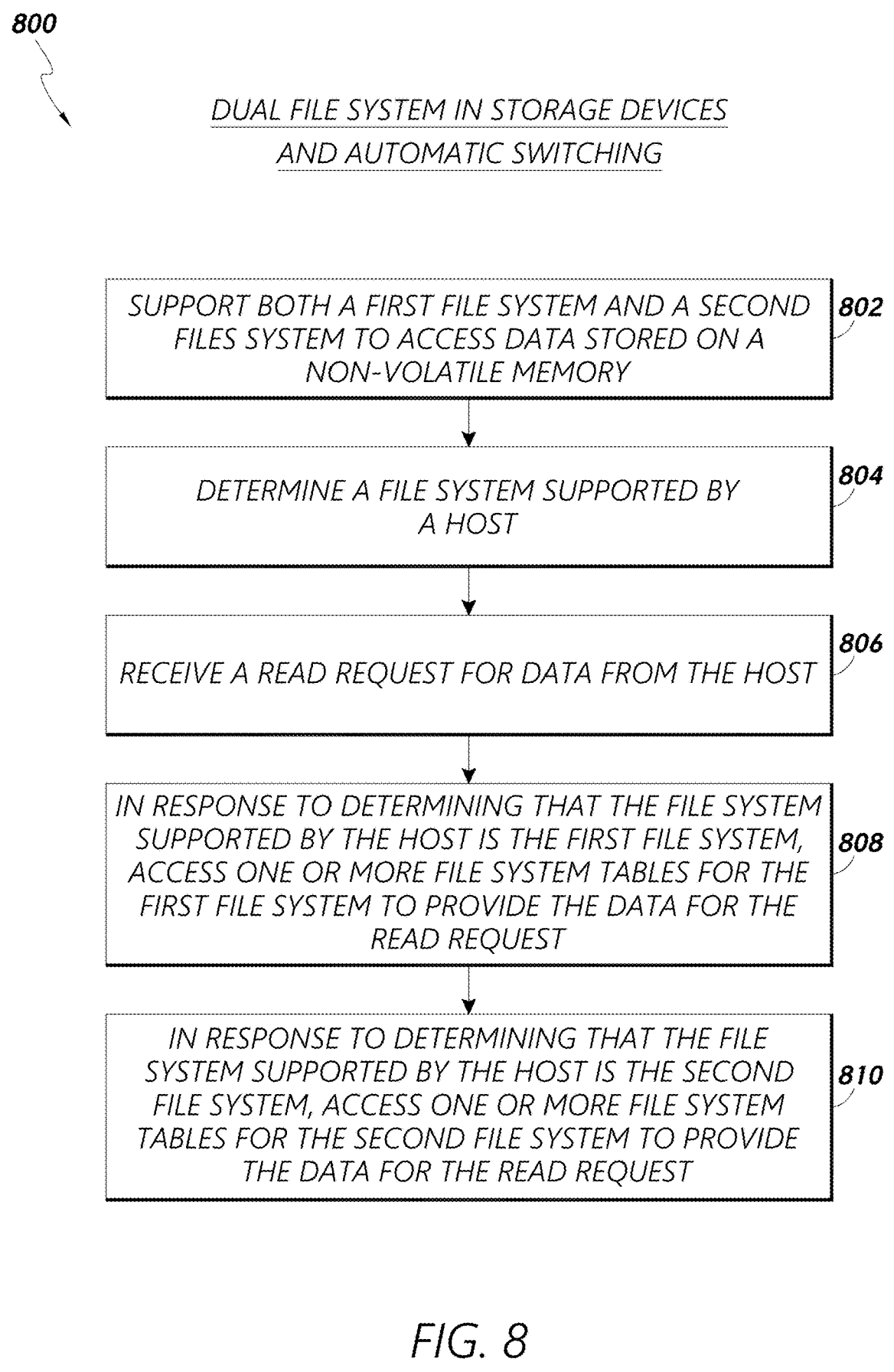

*800*

DUAL FILE SYSTEM IN STORAGE DEVICES AND AUTOMATIC SWITCHING

SUPPORT BOTH A FIRST FILE SYSTEM AND A SECOND FILES SYSTEM TO ACCESS DATA STORED ON A NON-VOLATILE MEMORY | *802*

DETERMINE A FILE SYSTEM SUPPORTED BY A HOST | *804*

RECEIVE A READ REQUEST FOR DATA FROM THE HOST | *806*

IN RESPONSE TO DETERMINING THAT THE FILE SYSTEM SUPPORTED BY THE HOST IS THE FIRST FILE SYSTEM, ACCESS ONE OR MORE FILE SYSTEM TABLES FOR THE FIRST FILE SYSTEM TO PROVIDE THE DATA FOR THE READ REQUEST | *808*

IN RESPONSE TO DETERMINING THAT THE FILE SYSTEM SUPPORTED BY THE HOST IS THE SECOND FILE SYSTEM, ACCESS ONE OR MORE FILE SYSTEM TABLES FOR THE SECOND FILE SYSTEM TO PROVIDE THE DATA FOR THE READ REQUEST | *810*

*FIG. 8*

NTFS-FAT32 DUAL FILE SYSTEM IN STORAGE DEVICES AND AUTOMATIC SWITCHING

BACKGROUND

Field

This disclosure relates to data storage devices. More particularly, the disclosure relates to devices and methods for providing a dual file system in data storage devices.

Description of Related Art

In many cases, a host can support a particular file system out of many available file systems. In such cases, a data storage device that does not support the file system used by the host may not be accessed by the host or may need to be formatted to the file system used by the host, which can be inconvenient for users.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIGS. 3A-3C illustrate a workflow process for data transfer initialization between a host and a data storage device configured to provide a dual file system, according to certain embodiments.

FIG. 6 illustrates a workflow process for file system switching in a data storage device configured to provide a dual file system, according to certain embodiments.

FIGS. 7A-7C illustrate a workflow process for FAT and NTFS systems in a data storage device configured to provide a dual file system, according to certain embodiments.

FIG. 8 illustrates a workflow process for providing a dual file system in a data storage device, according to certain embodiments.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

Overview

In many cases, a host only supports a particular file system. For example, a host can support a file system, such as a File Allocation Table 32 (FAT32) file system or a New Technology File System (NTFS) file system. In such cases, a host can only communicate with a data storage device that supports a file system supported by the host, or a host needs to format the data storage device to use a file system supported by the host. However, being unable to use a data storage device that does not support a compatible file system or formatting a data storage device to use a compatible file system can be inconvenient for users.

A data storage device according to certain aspects can provide a dual file system that supports multiple file systems. For instance, a data storage device can support multiple file systems to access the same data. As an example, a data storage device can support both the FAT32 file system and the NTFS file system to access the data stored on the data storage device. When the data storage device is initially formatted by a host, the data storage device can generate one or more tables for a first file system supported or selected by the host. The data storage device can also generate one or more tables for a second file system such that file system tables for both the first and second file systems are created on the data storage device. The data storage device can then communicate with and be accessible by hosts that support either the first file system, the second file system, or both. In this way, the data storage device can provide a dual file system to access the same data, and hosts supporting different file systems can access the data storage device without having to back up and format the data storage device to use a particular file system that is used by the host. The data storage device can support various combinations of file systems, depending on the embodiment. Details relating to a dual file system in data storage devices are further explained below in connection with FIGS. 1-9.

NTFS-FAT32 Dual File System in Storage Devices and Automatic Switching

Figure 1:
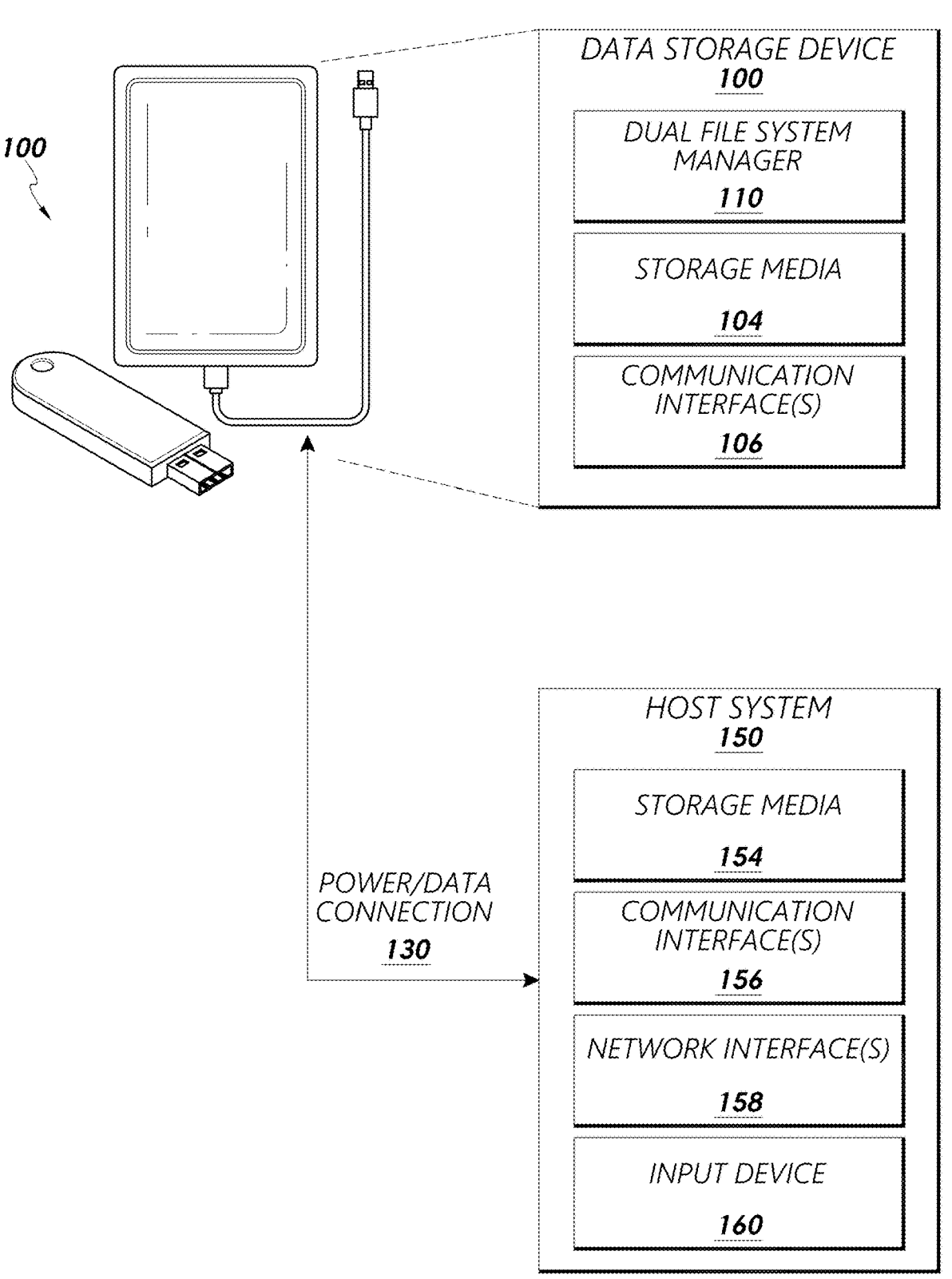
FIG. 1 illustrates a block diagram of a data storage device configured to provide a dual file system, according to certain embodiments.

FIG. 1 illustrates a block diagram of a data storage device 100 configured to provide a dual file system, according to certain embodiments. The data storage device (DSD) 100 can include a dual file system manager 110, storage media 104, and a communication interface 106. The data storage device 100 can be an external storage device. The data storage device 100 can employ a variety of storage technologies and/or form factors. For example, the data storage device 100 may be a solid-state drive (SSD), Secure Digital (SD) card, a Universal Serial Bus (USB) memory stick that uses semiconductor memory as the storage media 104, etc. In other implementations, the data storage device 100 may be a hard disk drive (HDD) that uses magnetic disks as the storage media 104 or a solid-state hybrid drive (SSHD) that uses a combination of semiconductor memory and magnetic disk technology.

A host system or host 150 can include storage media 154, a communication interface 156, a network interface 158, and an input device 160. The storage media 154 can store data files and can include an SSD, SSHD, HDD, or the like. The communication interface 156 can provide a power and/or a data connection 130 to the DSD 100. For example, the communication interface can be a USB port and associated controller. The network interface 158, such as Wi-Fi or ethernet, can enable the host 150 to receive data from network servers from the Internet or other network over a network connection. The input device 160 can receive commands from a user. The host 150 may be a computer, a laptop, a mobile device, or the like.

The host 150 may only support a particular file system, such as FAT32 file system or NTFS. For instance, certain hosts support only FAT32, but do not support the NTFS. Examples of such hosts may include Linux/smart televisions (TVs), media streaming devices or players, digital cameras, smartphones supporting a custom operating system (OS), an Android OS, iOS, etc. Accordingly, for hosts supporting only FAT32, a DSD using NTFS is not readable. Other hosts support only NTFS, and similarly, a DSD using FAT32 is not readable for such hosts. If a DSD is formatted in NTFS, the DSD may be used mostly with Windows OS and may be limited in OS/host compatibility. If the host and the DSD support incompatible file systems, a user may copy or move data on the DSD to another device and format the DSD to use a file system compatible with the host, then copy the backed up data to the formatted DSD. This can be time consuming and may also lead to data loss. In certain cases, file conversion techniques may be implemented in OS and partition managers to convert one file system to another file system, but such conversion techniques do not provide file system tables/information for both file systems for the same data stored in a DSD.

Accordingly, the DSD 100 can provide a dual file system that supports different file systems that point to the data stored on the DSD 100 such that the same data can be accessed using either file system. When the DSD 100 is initially formatted by a host 150, the DSD 100 can generate file system tables/information for a first file system supported or selected by the host 150. The DSD 100 can also generate file system tables/information for a second file system, which may not be supported or selected by the host 150 but is supported by the DSD 100. For instance, the file system tables/information for the first file system may be converted to file system tables/information for the second file system. In this way, file system tables/information for both the first and second file systems are created and maintained on the DSD 100. The DSD 100 can store and manage information about a host 150 such that the DSD 100 can mount the file system supported by the host 150 the next time the host 150 connects to the DSD 100. When a host 150 that previously connected to the DSD 100 is connected again to the DSD 100, the DSD 100 initializes to the file system that the host 150 used last time. However, if the host 150 does not recognize the file system previously used, the DSD 100 can reinitialize to the other file system supported by the DSD 100.

The DSD 100 can receive a read request from a host 150 and access file system tables/information for the file system supported by the host 150 to provide data associated with the read request. The DSD 100 can receive a write request from a host 150 and generate entries in file system tables/information for the file system supported by the host 150. The DSD 100 can also generate entries in file system tables/information for another file system that is supported by the DSD 100, which may or may not be supported by the host 150. The file system tables/information for different file systems can be stored in separate partitions or sections in the DSD 100.

In many examples, a DSD 100 is described as supporting FAT32 and NTFS file systems, but a DSD 100 can support various combinations of file systems as appropriate. Examples of file systems can include a NTFS, a FAT file system, a FAT32 file system, an Extended File Allocation Table (ExFAT) file system, an Apple File System (APFS), an Extended File System (Ext), etc. In certain embodiments, the DSD 100 can support more than two file systems.

In some embodiments, the DSD 100 can include a dual file system manager 110 that implements various functionalities related to providing a dual file system. The dual file system manager 110 can be implemented in hardware, firmware, and/or software, etc., for instance, using various components of the DSD 100. An example implementation is shown in the DSD 200 in FIG. 2A. The dual file system manager 110 can be implemented using one or more components of the DSD 200.

In this way, the DSD 100 can provide a dual file system to access the same data on the DSD 100, and a host 150 can access the DSD 100 without having to format the DSD 100 to use a particular file system that is compatible with the host 150. Details relating to functionalities of the dual file system manager 110 and providing a dual file system in data storage devices are described further in connection with FIGS. 2-9 below.

Figure 2A:
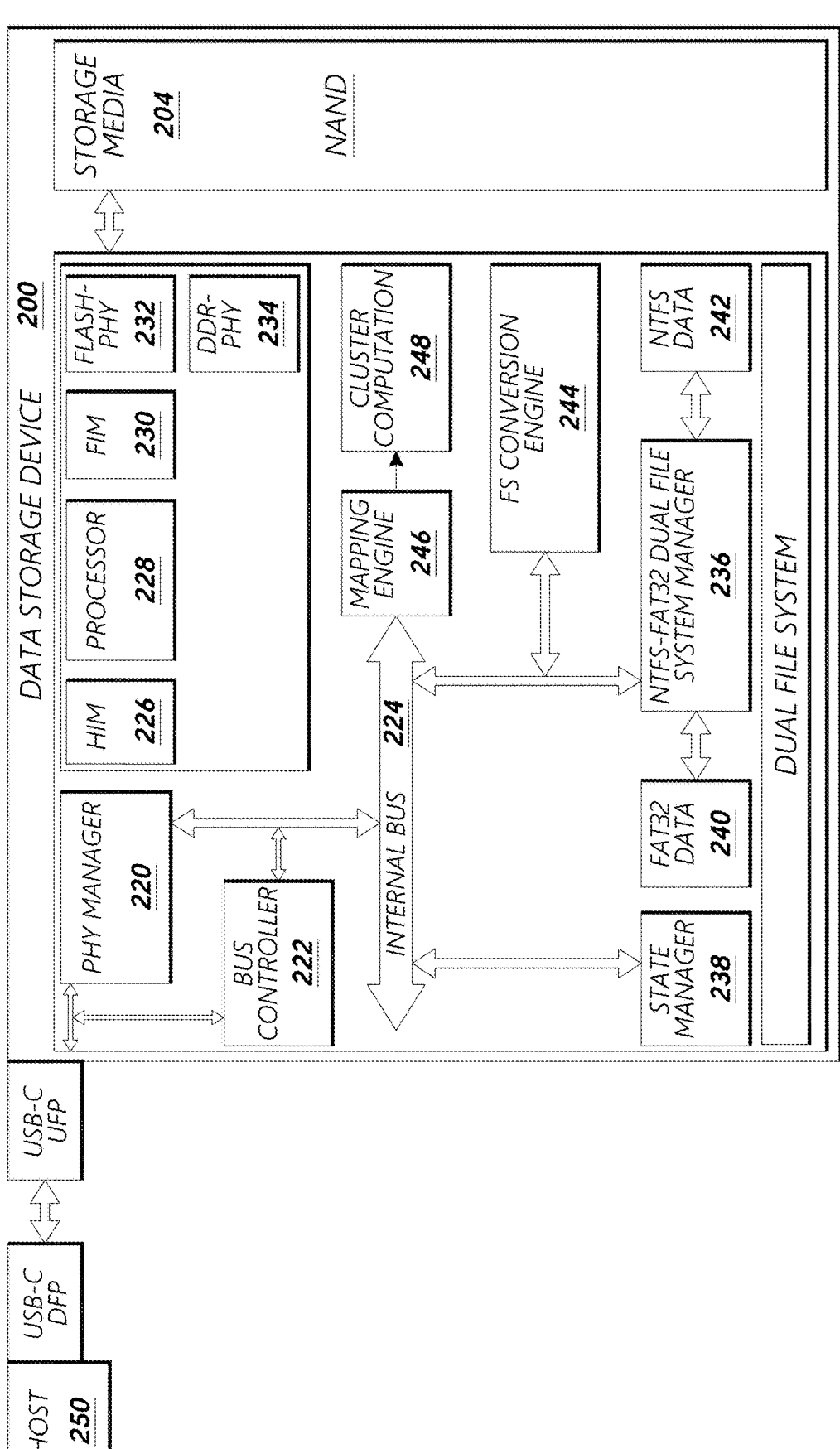
FIGS. 2A-2B illustrate a block diagram of an example data storage device configured to provide a dual file system, according to certain embodiments.
Figure 2B:
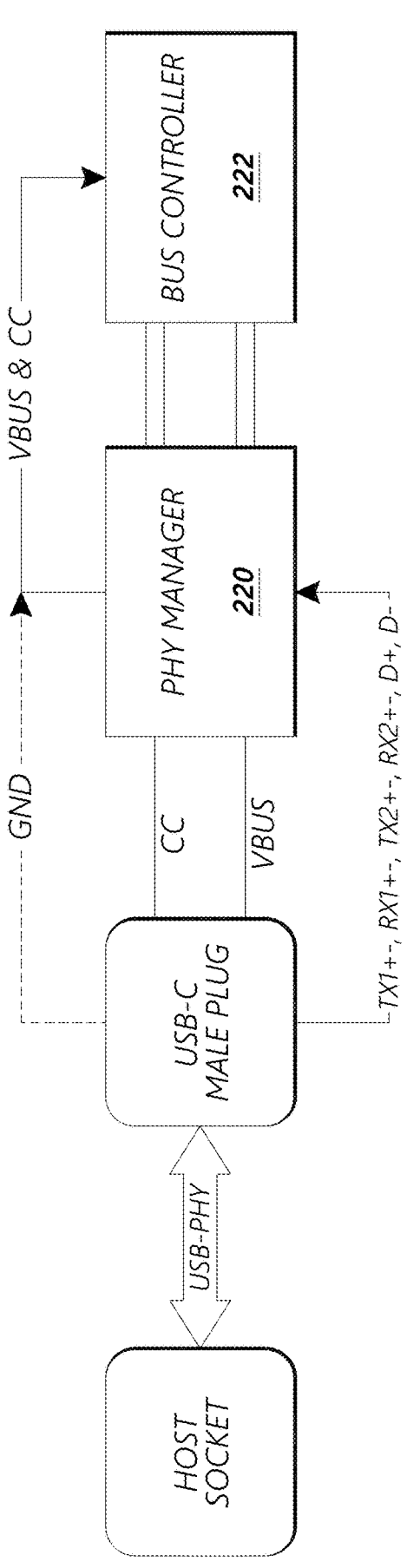

FIGS. 2A-2B illustrate a block diagram of an example data storage device 200 configured to provide a dual file system, according to one or more embodiments. In some embodiments, components of FIGS. 2A-2B can be similar to components of FIG. 1 having similar names and/or reference numbers. For example, the data storage device 200 can be similar to a data storage device 100 in FIG. 1. Certain details relating to FIGS. 2A-2B are described above in connection with FIG. 1.

A data storage device 200 can communicate with a host 250. For example, the host 250 can include a USB-C downstream facing port (DFP), and the DSD 200 can include a USB-C upstream facing port (UFP). Other types of USB ports or other types of ports may also be used. Many variations are possible. Different types of communication protocols can be used as appropriate. The DSD 200 can include various components, such as control circuitry and storage media 204. As shown in FIG. 2A, the DSD 200 is an SSD device, and the storage media 204 includes NAND arrays/memory. The control circuitry can include hardware and/or software (e.g., firmware) for providing a dual file system, such as a dual file system manager 110. For example, the control circuitry can include a controller and/or various components. The control circuitry can be similar to the control circuitry 902 of the DSD 900 in FIG. 9. The control circuitry can include additional functionality, such as file-based storage, functionality for managing data transfers of the DSD 200, etc. The control circuitry may also include a processor, an error correction code (ECC) engine, and any other suitable component. A processor can be configured to execute instructions related to processing various operations. An ECC engine can perform error correction for data, such as generating parity data. The storage media 204 can store data.

In the example of FIG. 2A, the DSD 200 includes an NTFS-FAT32 dual file system (FS) manager 236, a state manager 238, a FAT32 data 240, an NTFS data 242, a file system conversion engine 244, a mapping engine 246, and a cluster computation component 248. The DSD 200 can also include a PHY manager 220, a bus controller 222, an internal bus 224, a host interface manager (HIM) 226, a processor 228, a flash interface manager or module (FIM) 230, a flash-PHY 232, and a DDR-PHY (Double Data Rate Synchronous Dynamic Random-Access Memory (SDRAM)-PHY) 234. The various components of the DSD 200 may be implemented by the control circuitry, the storage media 204, and/or one or more components of the DSD 200. The DSD 200 and/or the control circuitry may include additional, different, or fewer components, depending on the embodiment. One or more components may be combined or implemented as separate components, depending on the embodiment.

According to certain aspects, the dual file system manager 110 in FIG. 1 can be implemented using or as one or more components of the DSD 200. For instance, the dual file system manager 110 can include the NTFS-FAT32 dual FS manager 236, the state manager 238, the FAT32 data 240, the NTFS data 242, the FS conversion engine 244, the mapping engine 246, and/or the cluster computation component 248. The dual file system manager 110 may further include the PHY manager 220, the bus controller 222, the internal bus 224, the HIM 226, the processor 228, the FIM 230, the flash-PHY 232, and/or the DDR-PHY 234, depending on the embodiment. The dual file system manager 110 may be implemented by the control circuitry of the DSD 200. The dual file system manager 110 may be implemented in firmware, which may be run on a controller chip. In some implementations, the dual file system manager 110 may be a specialized, hardware-based chip for implementing a dual file system. The dual file system manager 110 may be implemented as one or more components or one or more modules. Many variations are possible.

The NTFS-FAT32 dual FS manager 236 can manage overall process of generating file system tables/information for both NTFS and FAT32 and mounting an appropriate file system for a host 250. In the example of FIG. 2A, the dual FS manager 236 is described as the NTFS-FAT32 dual FS manager for illustrative purposes, and the NTFS-FAT32 dual FS manager 236 can support any combination of different available file systems. The NTFS-FAT32 dual FS manager 236 may also be referred to as the "dual FS manager" 236 to facilitate discussion. The state manager 238 can store and manage various state information associated with hosts 250 that connect to the DSD 200. For instance, the state manager 238 can store information relating to a host 250 and previously or currently connected file systems for the host 250, including previous state and/or current state of the file system connected to the host 250. The FAT32 data 240 can indicate data associated with FAT32. In some cases, the FAT32 data 240 may indicate a component that can store data associated with FAT32 on the DSD 200. The NTFS data 242 can indicate data associated with NTFS. In some cases, the NTFS data 242 may indicate a component that can store data associated with NTFS on the DSD 200. The FAT32 data 240 and the NTFS data 242 can be respective SRAM or non-volatile regions. The FS conversion engine 244 can convert file system tables/information for one file system to file system tables/information for another file system. The mapping engine 246 can provide a mapping between logical block addresses (LBAs) and physical block addresses (PBAs) for the data stored on the storage media 204. The cluster computation component 248 can determine cluster information associated with the mapping managed by the mapping engine 246.

The PHY manager 220 can manage the physical interface with the host 250. The bus controller 222 can manage data buses for communicating with the host 250. The internal bus 224 can enable communication between various components of the DSD 200. The HIM 226 can be coupled to the PHY manager 220 and manage interfacing and communication between the host 250 and the DSD 200. Examples of the interface between the host 250 and the DSD 200 may include peripheral component interconnect express (PCIe), serial advanced technology attachment (SATA), non-volatile memory express (NVMe), etc. The HIM 226 can receive various commands, such as read or write commands. The processor 228 can execute instructions related to processing various operations. The FIM 230 can manage flash interface and perform any related functionalities. The DSD 200 may also include a flash translation layer (FTL) that may handle translation of LBAs from the host 250 to physical addresses on the storage media 204 as well as garbage collection, wear leveling, etc. The flash-PHY 232 can connect to and manage NAND memory. The DDR-PHY 234 can connect to and manage Dynamic Random-Access Memory (DRAM).

When the host 250 requests to format the DSD 200, the dual FS manager 236 and the FS conversion engine 244 can format the DSD 200 according to the requested file system and also perform internal conversion and mapping to another file system that is not selected by the host 250. If the host formatted file system is a FAT file system, the dual FS manager 236 can create an NTFS MFT table and start journaling automatically based on the FAT32 table and store them in the NTFS data 242. Similarly, if the host formatted file system is an NTFS file system, the dual FS manager 236 can create FAT32 tables based on the NTFS MFT table and store them in the FAT32 data 240. In many cases, file system handling is a function of the host 250, but the DSD 200 can handle both file systems within the DSD 200 and maintain FAT entries and MFT in separate storage internally. The FAT32 data 240 and the NTFS data 242 can be in protected sections or partitions, and can be separate from user data, for example, to ensure data integrity and prevent corruption. The DSD 200 can support and manage FAT and MFT table generation, data mapping, cluster computation, file switching, and various functionalities associated with providing a dual file system.

After the DSD 200 is formatted, when the DSD 200 is connected to the host 250, the DSD 200 can be initialized in the previously formatted file system state, send a packet, and establish connectivity with the host 250. The state information can be stored and managed by the state manager 238, and if the host 250 supports file systems other than the previous state, the dual FS manager 236 can recognize that the host 250 is unable to read the file system and that the DSD 200 is unreadable.

If the DSD 200 enters an unreadable state, the dual FS manager 236 can send a signal to the PHY manager 220 and the bus controller 222 to disable host physical data bus connectivity, but to keep power buses (e.g., VBus, CC) enabled. Once the dual FS manager 236 receives the data bus disabled acknowledgment, the dual FS manager 236 can switch the internal file system scheme to FAT using the FS conversion engine 244 and then reinitialize the DSD 200 internally. When reinitialization is completed, the dual FS manager 236 can send a signal to the PHY manager 220 to enable the data bus and start sending and receiving commands.

FIG. 2B illustrates the PHY manager 220 and the bus controller 222 and disabling/enabling of data buses and/or power buses. The PHY manager 220 and/or the bus controller 222 can use different power and data bus switching methods or techniques. USB-C can include various pins, such as GND, TX+, TX−, RX+, RX−, D+, D−, VBus, CC, etc. The PHY manager 220 can turn on or off various pins, buses, configuration channel, etc. as appropriate.

Figure 3B:
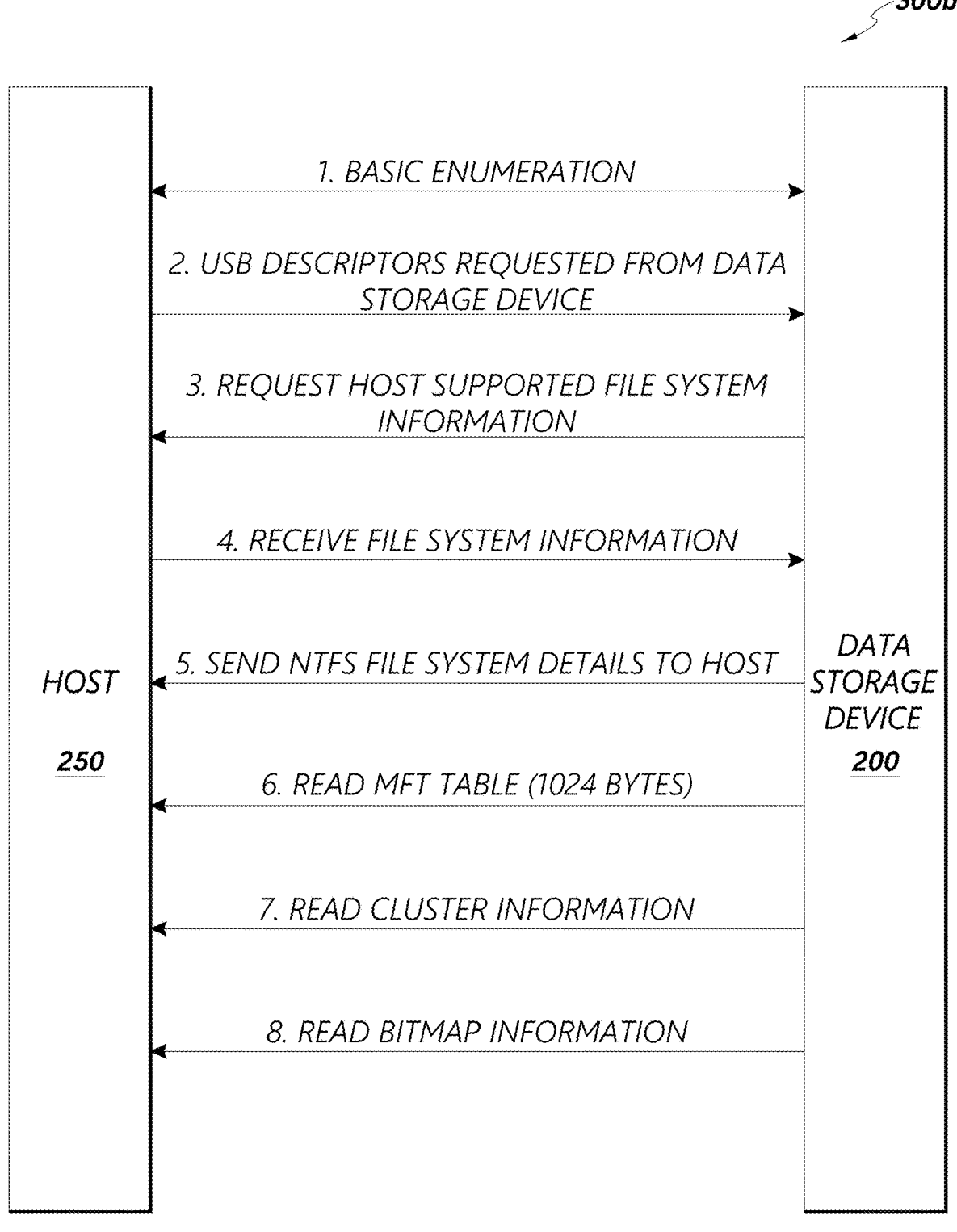

FIGS. 3A-3B illustrate a workflow process 300*a* and 300*b* for data transfer initialization between a host and a data storage device configured to provide a dual file system, according to certain embodiments. The workflow process 300a, 300b may be implemented by a data storage device, such as a data storage device 100, 200 in FIGS. 1-2A. For example, the workflow process 300a, 300b may be performed in part or in whole by a data storage device or one of its components, such as control circuitry, a processor, or a dual file system manager 110. For illustrative purposes, the process 300a, 300b is explained below in connection with the data storage device 200 and the host 250 in FIG. 2A. Certain details relating to the process 300a, 300b are explained in more detail with respect to FIGS. 1-2. Depending on the embodiment, the process 300a, 300b may include fewer or additional blocks, and the blocks may be performed in an order that is different from illustrated.

FIG. 3A illustrates a workflow process 300a for data transfer initialization between a host 250 and a data storage device 200 for a FAT file system. At block 1, the host 250 and the DSD 200 perform a basic enumeration process. At block 2, the host 250 requests USB descriptors from the DSD 200. At block 3, the DSD 200 requests host supported file system information from the host 250. At block 4, the DSD 200 receives the file system information from the host 250. At block 5, the DSD 200 sends the FAT file system details to the host 250. At block 6, the host 250 reads the master boot record (MRB) (e.g., 512 bytes). At block 7, the host 250 reads the volume boot record (VBR) (e.g., 512 bytes). At block 8, the host 250 reads the FAT. At block 9, the host 250 reads the cluster (e.g., logical block address (LBA), logical unit number (LUN)).

FIG. 3B illustrates a workflow process 300b for data transfer initialization between a host 250 and a data storage device 200 for an NTFS. At block 1, the host 250 and the DSD 200 perform a basic enumeration process. At block 2, the host 250 requests USB descriptors from the DSD 200. At block 3, the DSD 200 requests host supported file system information from the host 250. At block 4, the DSD 200 receives the file system information from the host 250. At block 5, the DSD 200 sends the NTFS file system details to the host 250. At block 6, the host 250 reads the master file table (MFT) table (e.g., 1024 bytes). At block 7, the host 250 reads cluster information. At block 8, the host 250 reads bitmap information.

When the host 250 tries to read and access MFT or MBR partition details, the dual FS manager 236 can send the requested file system details to the controller and synchronize USB packets with the host 250. This can enable the DSD 200 to respond to different packets and detect whether the host 250 supports NTFS or FAT. The dual FS manager 236 can read and create or manage MBR, VBR, and FAT tables in the FAT32 data 240. The dual FS manager 236 can also read and create GPT (Globally Unique Identifier (GUID) partition table) partitions within the DSD 200 and create or manage MFT tables in the NTFS data 242. When the DSD 200 is connected to the host 250, the host 250 can request descriptors to the DSD 200 as a USB Mass Storage Class, and the DSD 200 can send an acknowledgment. If the host 250 cannot recognize the acknowledgment and does not respond or send the next packet and enters an unreadable state, then the DSD 200 can reinitialize.

The process 300a, 300b may be performed when the host 250 initializes a connection with the DSD 200. The DSD 200 may be physically connected by a user to a data interface of the host 250. The data interface may a USB port on the host system, directly connected port-to-port (e.g., flash drive inserted into a host USB port) or indirectly connected by a USB cable to another USB port on the DSD 200. Other types of data interfaces can also be used, such as Lightning, Thunderbolt, external serial ATA (eSATA), Secure Digital (SD) reader, microSD reader, or the like.

Initializing the connection may involve a handshake or other negotiation process. For example, USB devices utilize USB enumeration to establish a connection. USB enumeration is a process that takes place when a USB device is connected to a computer or other host system. Upon connection, the USB controller on the host system detects the device and establishes its power requirements. The controller then communicates with the device to determine its supported USB speed, such as USB 2.0 or USB 3.0. Next, the USB device provides its Vendor ID (VID) and Product ID (PID) to the host, which helps the OS identify the device and locate the appropriate device drivers.

The OS then checks its driver database or datastore and either prompts the user for driver installation or automatically installs the necessary driver for the device. Once the driver is loaded, the host OS configures the USB device by assigning resources and determining its capabilities. Endpoint allocation can then take place, where the host OS assigns logical channels (endpoints) for data transfer based on the device's defined interfaces. The OS notifies relevant applications or services about the connected device, enabling them to interact with the device using the appropriate Application Programming Interface (API). With the enumeration process complete, the USB device and the host computer are ready to exchange data through the allocated endpoints.

Figure 4A:
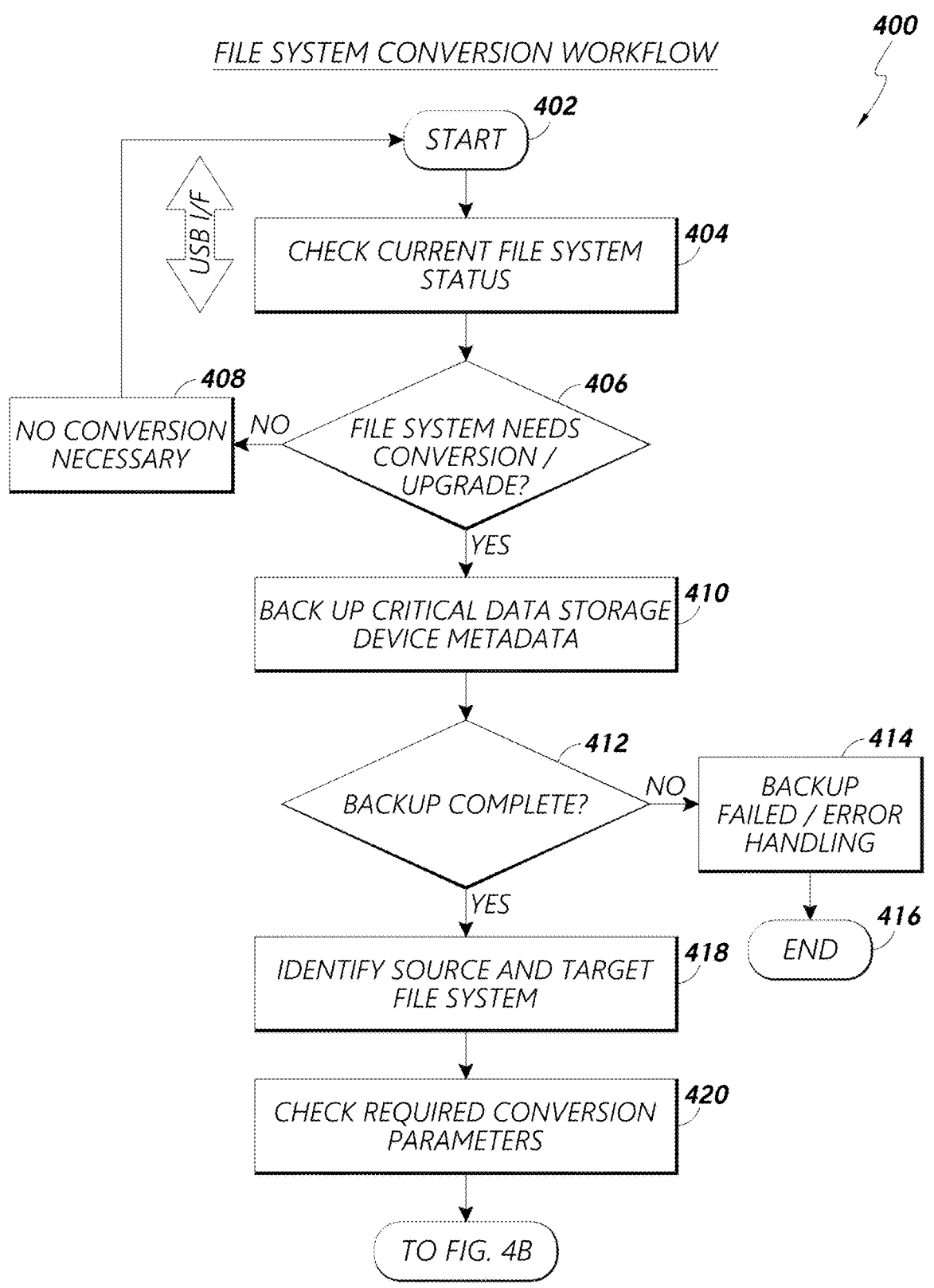
FIGS. 4A-4B illustrate a workflow process for file system conversion in a data storage device configured to provide a dual file system, according to certain embodiments.
Figure 4B:
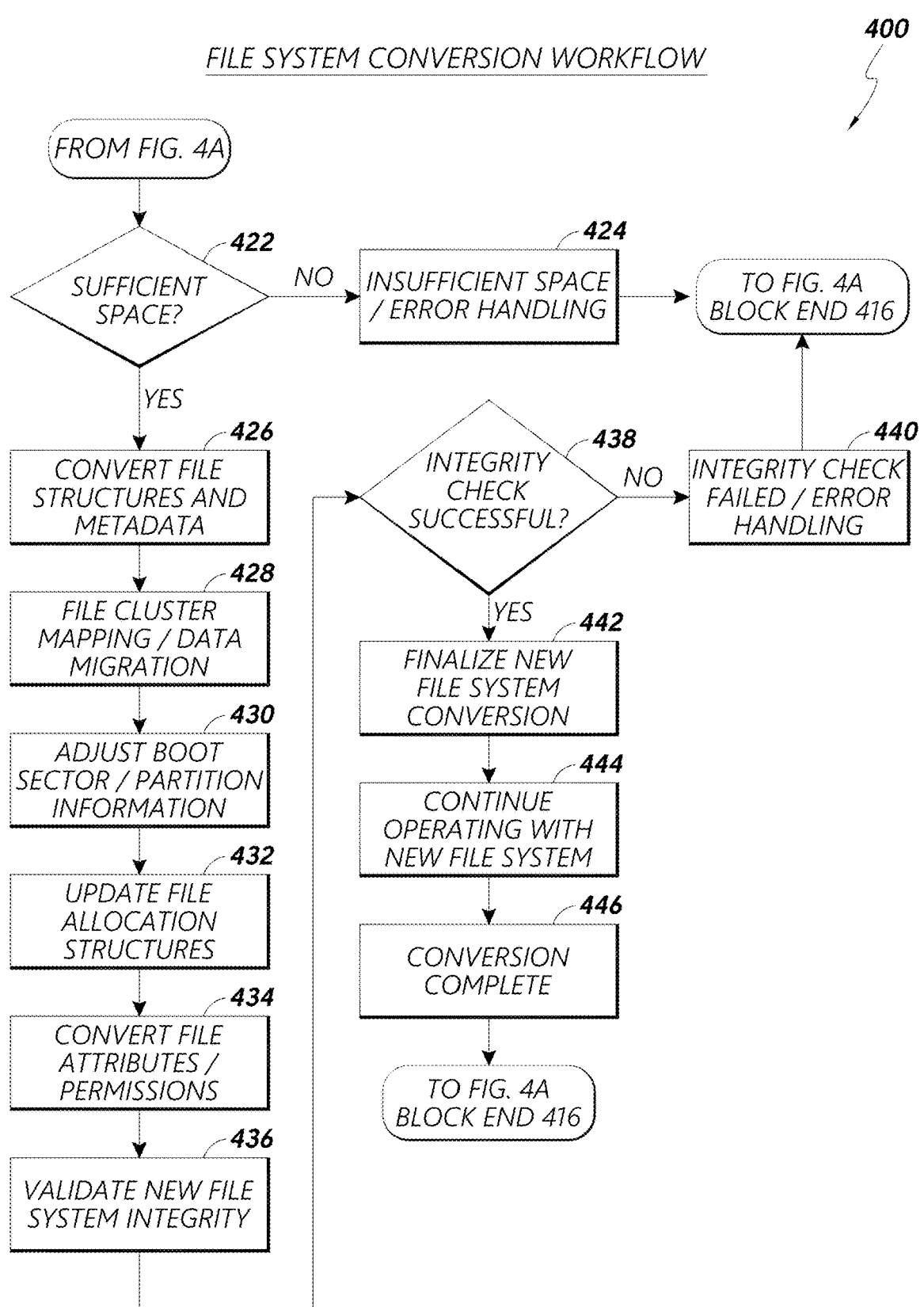

FIGS. 4A-4B illustrates a workflow process 400 for file system conversion in a data storage device configured to provide a dual file system, according to one or more embodiments. The workflow process 400 may be implemented by a data storage device, such as a data storage device 100, 200 in FIGS. 1-2A. For example, the workflow process 400 may be performed in part or in whole by a data storage device or one of its components, such as control circuitry, a processor, or a dual file system manager 110. For illustrative purposes, the process 400 is explained below in connection with the data storage device 200 and the host 250 in FIG. 2A. Certain details relating to the process 400 are explained in more detail with respect to FIGS. 1-3. Depending on the embodiment, the process 400 may include fewer or additional blocks, and the blocks may be performed in an order that is different from illustrated.

The process 400 starts at block 402. The process 400 may use the USB interface (I/F). For example, the dual FS manager 236 can autonomously initiate file system conversion (e.g., FAT32 to NTFS). At block 404, the DSD 200 checks the current file system status. The dual FS manager 236 can read internal file system structures, such as FAT tables, boot sector, MBR, and the DSD 200 partition table, to determine the current file system type and assess its health. At block 406, the DSD 200 checks whether the file system needs conversion/upgrade. The dual FS manager 236 can determine whether conversion is required or both FAT and NTFS tables are already in an active state. If the file system does not need conversion/upgrade at block 406, the process 400 proceeds to block 408. At block 408, the DSD 200 determines that no conversion is necessary and continues operation with the current file system, and the process 400 returns to block 402. If the file system needs conversion/upgrade at block 406, the process 400 proceeds to block 410. At block 410, the DSD 200 backs up critical or important data storage device metadata. The dual FS manager 236 can initiate an automatic backup process, storing key sectors like MBR, boot sector, FAT tables, and directory structures.

Backup can be stored in a reserved area (e.g., FAT32 data 240 or NTFS data 242 sections of the DSD 200), typically separate from user data.

At block 412, the DSD 200 determines whether backup is complete. If the backup is not complete at block 412, the process 400 proceeds to block 414. At block 414, the DSD 200 determines that the backup failed and performs error handling. The state manager 238 can log errors, notify the host 250 if required, revert, or stop the conversion process. The process 400 ends at block 416. If the backup is complete at block 412, the process 400 proceeds to block 418. At block 418, the DSD 200 identifies a source file system and a target file system. The FS conversion engine 244 can identify a source file system as the current file system (e.g., FAT32) by reading the boot sector. The FS conversion engine 244 can identify the target file system (e.g., NTFS) either based on preconfigured settings or algorithms or based on internal decision-making algorithms like efficiency or error handling strategy. At block 420, the DSD 200 checks required conversion parameters. The FS conversion engine 244 can ensure sector size, cluster size, and allocation unit compatibility between the source and target file systems. The FS conversion engine 244 can perform calculations for the target file system based on partition size, free space, and file alignment requirements. The FS conversion engine 244 can allocate buffer space for intermediate data transfers. The process 400 continues to FIG. 4B.

In FIG. 4B, the process 400 continues at block 422. At block 422, the DSD 200 determines whether sufficient space exists on the DSD 200. The FS conversion engine 244 can check if enough storage is available for file system metadata conversion. If insufficient space exists on the DSD 200 at block 422, the process 400 proceeds to block 424. At block 424, the DSD 200 determines that there is insufficient space and performs error handling. The state manager 238 can log errors, attempt recovery, and revert to the original file system. The process 400 proceeds to and ends at block 416 in FIG. 4A. If sufficient space exists on the DSD 200 at block 422, the process 400 proceeds to block 426. At block 426, the DSD 200 converts file structures and metadata. The FS conversion engine 244 can convert FAT tables to NTFS MFTs, migrate file records, and update cluster chains. The FS conversion engine 244 can rebuild directory tree structures and convert metadata such as file attributes, creation/modification timestamps, and file permissions. At block 428, the DSD 200 performs file cluster mapping and data migration. The FS conversion engine 244 can reorganize cluster allocation to match the new file system structure. The FS conversion engine 244 can convert large FAT32 cluster sizes to smaller NTFS clusters, preserving file continuity and integrity. The FS conversion engine 244 may migrate file data into new cluster arrangement, ensuring no data fragmentation or loss.

At block 430, the DSD 200 adjusts boot sector/partition information. The FS conversion engine 244 can rewrite the boot sector with the new file system specific data, such as the NTFS boot signature, to the NTFS data 242 section. The FS conversion engine 244 can update the partition table in the MBR to indicate NTFS, including the type code (e.g., 0x07 for NTFS), and ensure the DSD 200 can boot or mount correctly under the new file system. At block 432, the DSD 200 updates file allocation structures. The FS conversion engine 244 can convert the FAT32 file allocation table into the NTFS master file table. This can include updating file offsets, cluster pointers, and creating security descriptors for the NTFS advanced permission handling system. At block 434, the DSD 200 converts file attributes/permissions. For NTFS, the mapping engine 246 can assign file security attributes like ownership, access control lists (ACLs), and inheritance, which may not exist in FAT32. The mapping engine 246 can convert read-only, hidden, archive, and system attributes as well. At block 436, the DSD 200 validates new file system integrity. The mapping engine 246 can perform an internal integrity check using the DSD 200 firmware routines. The mapping engine 246 can verify file cluster chains, directory structures, and sector alignment, and ensure metadata consistency. The mapping engine 246 can detect and handle any conversion anomalies.

At block 438, the DSD 200 determines whether the integrity check is successful. If the integrity check is not successful at block 438, the process 400 proceeds to block 440. At block 440, the DSD 200 determines that the integrity check failed and performs error handling. The state manager 238 can log errors, revert changes, and/or stop operation, and notify the host 250 if needed. The process 400 proceeds to and ends at block 416 in FIG. 4A. If the integrity check is successful at block 438, the process 400 proceeds to block 442. At block 442, the DSD 200 finalizes new file system conversion. The mapping engine 246 can commit final changes and rewrite all modified file system structures. The mapping engine 246 can finalize MFT for NTFS, update file directory pointers, and apply final permissions. The mapping engine 246 can store these data into NTFS data 242 and FAT32 data 240 blocks via the dual FS manager 236. At block 444, the DSD 200 continues operating with the new file system. The DSD 200 can now operate fully under the new file system (e.g., NTFS). Transition is complete, and the dual FS manager 236 can resume normal operations. At block 446, the file system conversion is complete, and the DSD 200 is now using the new file system. The process 400 proceeds to and ends at block 416 in FIG. 4A.

In the example of FIGS. 4A-4B, the file system is converted from FAT32 to NTFS, but the file system may also be converted from NTFS to FAT32. In some embodiments, the file system conversion can be performed after the DSD 200 is formatted using a first file system to generate file system table/information for a second file system. In certain cases, the DSD 200 may generate file system table/information for a second file system without switching to the second file system.

Figure 5:
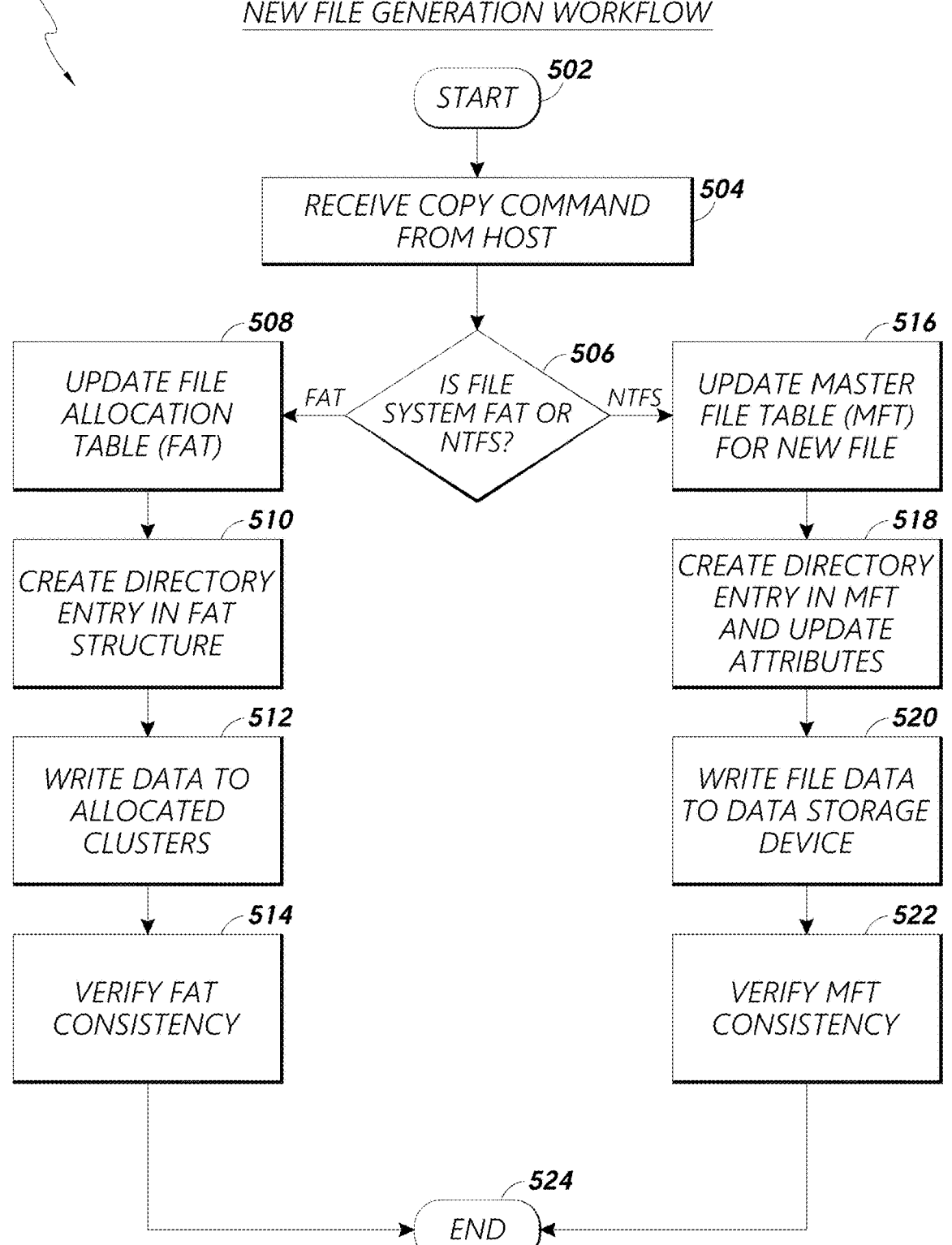
FIG. 5 illustrates a workflow process for new file generation in a data storage device configured to provide a dual file system, according to certain embodiments.

FIG. 5 illustrates a workflow process 500 for new file generation in a data storage device configured to provide a dual file system, according to one or more embodiments. The workflow process 500 may be implemented by a data storage device, such as a data storage device 100, 200 in FIGS. 1-2A. For example, the workflow process 500 may be performed in part or in whole by a data storage device or one of its components, such as control circuitry, a processor, or a dual file system manager 110. For illustrative purposes, the process 500 is explained below in connection with the data storage device 200 and the host 250 in FIG. 2A. Certain details relating to the process 500 are explained in more detail with respect to FIGS. 1-4. Depending on the embodiment, the process 500 may include fewer or additional blocks, and the blocks may be performed in an order that is different from illustrated.

When a user copies new data to the DSD 200, all file system entries and tables can be updated automatically for both file systems supported by the DSD 200. This can enable different hosts to access data on the DSD 200, regardless of the file system that was selected while formatting the DSD 200. When a new data write operation is requested from the host 250, the dual FS manager 236 can create links to blocks and store the links in the FAT32 data 240 and also create MFT table entries and store the entries in the NTFS data 242. Once data linking and table entry creation are completed, the requested data can be processed in the backend and then transferred to the storage media 204 via the control circuitry/ controller. Table entries and data link generation can be automated, regardless of the host supported file system. The mapping engine 246 can manage file size requirements for FAT32 and NTFS so that connected hosts can access data based on compatibility. If the host 250 only supports FAT32, then the mapping engine 246 can create a list of all files that can be accessed using FAT32, for example, files with a file size less than 4 gigabytes (GBs) and a 2 terabyte (TB) capacity.

The process 500 starts at block 502. For example, a file copy process can be started. At block 504, the DSD 200 receives a copy command from the host 250. The host 250 can initiate a file copy operation and validate the command syntax and parameters. At block 506, the DSD 200 determines whether the file system is FAT or NTFS. The DSD 200 can identify the file system type based on internal structures and/or metadata. If the file system is FAT at block 506, the process 500 proceeds to block 508. If the file system is NTFS, the process 500 proceeds to block 516.

At block 508, the DSD 200 updates the FAT. The DSD 200 can allocate clusters for the new file, locate free clusters in the FAT, and update the FAT with allocated cluster numbers. At block 510, the DSD 200 creates a directory entry in the FAT structure. The DSD 200 can update the directory entry to indicate the name, size, and attributes of the new file. The DSD 200 can also set creation and last modified timestamps. At block 512, the DSD 200 writes data to allocated clusters. The DSD 200 can transfer the file data to the storage media 204. The DSD 200 can use direct memory access (DMA) or interrupts for data transfer. At block 514, the DSD 200 verifies FAT consistency. The DSD 200 can check for errors in the FAT and validate cluster chains and linked lists. The process 500 ends at block 524.

At block 516, the DSD 200 updates the MFT for the new file. The DSD 200 can allocate space for new entries and metadata and record file attributes. At block 518, the DSD 200 creates a directory entry in the MFT and updates attributes. The information can include file name, size, and timestamps. At block 520, the DSD 200 writes file data to the storage media 204. The DSD 200 can store file contents in allocated data clusters and use write cache for improved performance. At block 522, the DSD 200 verifies MFT consistency. The DSD 200 can ensure integrity of the MFT and check for fragmented entries. The process 500 ends at block 524.

After the DSD 200 creates file system tables/information relating to the new data for a first file system, the DSD 200 can then create file system tables/information relating to the new data for a second file system. For instance, in the example of FIG. 5, if the currently selected file system is FAT32, the DSD 200 can create FAT32 file system tables/ information, then create NTFS file system tables/information for the same data. Or if the currently selected file system is NTFS, the DSD 200 can create NTFS file system tables/ information, then create FAT32 file system tables/information for the same data.

FIG. 6 illustrates a workflow process 600 for file system switching in a data storage device configured to provide a dual file system, according to one or more embodiments. The workflow process 600 may be implemented by a data storage device, such as a data storage device 100, 200 in FIGS. 1-2A. For example, the workflow process 600 may be performed in part or in whole by a data storage device or one of its components, such as control circuitry, a processor, or a dual file system manager 110. For illustrative purposes, the process 600 is explained below in connection with the data storage device 200 and the host 250 in FIG. 2A. Certain details relating to the process 600 are explained in more detail with respect to FIGS. 1-5. Depending on the embodiment, the process 600 may include fewer or additional blocks, and the blocks may be performed in an order that is different from illustrated.

When the DSD 200 is connected to the USB bus, the dual FS manager 236 can initialize the DSD 200 to check what type of USB connectivity happens between the DSD 200 and the host 250. The dual FS manager 236 can have the capability to read all the MBR data stored in the 0 sector of the die stored in the FAT32 data section 240 as well as the MFT tables stored in the 0 sector of the die in the NTFS data section 242. At the time of booting, the dual FS manager 236 can read data, check partition table data, check for "parti- tion-type" field data, and store this information (e.g., FAT32 or NTFS) in the state manager 238. When the host 250 requests a file system table or entry data to read, which is supposed to be stored in die0, sector 0, the dual FS manager 236 can fetch these details from the separate FAT or NTFS data sections 240, 242 and then synchronize with the control circuitry/controller to respond to the host 250 with the requested descriptors.

The process 600 starts at block 602. The DSD 200 can power on and initiate, and the host 250 can request file system metadata for mounting. At block 604, the DSD 200 reads boot sector and file system header. The DSD 200 can start by reading the boot sector, which contains important data about the layout and structure of the file system. This sector includes key information such as the file system identifier (FSID), Boot Parameter Block (BPB), and key tables like the FAT in case of FAT32. The DSD 200 can also examine the partition table to determine the partition bound- aries and the file system used within the partition. Signature bytes such as 0x55AA are verified to confirm that the boot sector is valid and intact. At block 606, the DSD 200 notifies the host 250 of the current file system. After reading the boot sector, the DSD 200 can send the current file system metadata (e.g., FSID, partition boundaries, cluster size, and file system structures) to the host 250, which can use this information to attempt to mount the file system. This meta- data can be important for the ability of the host 250 to understand the organization of the data.

At block 608, the DSD 200 determines whether the host 250 detects and mounts the file system. For example, if the file system is corrupt or the host 250 does not support the file system, the host 250 normal operation cannot detect the file system. If the host 250 detects and mounts the file system at block 608, the DSD 200 continues with normal operation at block 610. The process 600 ends at block 628.

If the host 250 does not detect and mount the file system at block 608, the DSD 200 performs an internal check for other file systems at block 612. If the host fails to detect the file system, the dual FS manager 236 can perform an internal scan to check for other file systems. This can involve scanning reserved sectors, hidden partitions or backup file system areas for valid signatures and file system structures. The dual FS manager 236 can verify that any alternative file systems are usable by checking their file system signatures, such as FAT32 0x55AA or NTFS structures in the MFT.

At block 614, the DSD 200 determines whether an alternative file system is available on the DSD 200. If the dual FS manager 236 identifies another valid file system, such as exFAT or NTFS, the dual FS manager 236 can prepare to switch internally to the alternative file system. If no valid system is found, the process 600 can log an error and halt further recovery attempts. During this step, the dual FS manager 236 can also inspect additional hidden partitions that may contain a backup file system. If an alternative file system is not available at block 614, the process 600 proceeds to block 616. At block 616, the DSD 200 determines that no other file system is available. If no alternative file system is found or all detected file systems are corrupt, the state manager 238 can log an error and send acknowledgment to the dual FS manager 236. The process 600 ends at block 628.

If an alternative file system is available at block 614, the process 600 proceeds to block 618. At block 618, the DSD 200 switches to the alternative file system. The dual FS manager 236 can update the partition table and rewrite the boot sector for the new file system. For example, the dual FS manager 236 may reset FAT tables for FAT32 or rebuild the MFT for NTFS. At block 620, the DSD 200 reinitializes the DSD 200 with the new file system. After switching to an alternative file system, the dual FS manager 236 can reinitialize the necessary metadata. This can include resetting key file system structures like the BPB and FAT tables for FAT32, or rebuilding the MFT for NTFS. During this process, the dual FS manager 236 can also rewrite the file system-specific boot code and update the signature bytes (e.g., 0x55AA for FAT systems) in the boot sector to ensure the file system is correctly recognized on the subsequent host 250 query. The dual FS manager 236 can also ensure that the FSID and other metadata are correctly configured to prevent future detection issues.

At block 622, the DSD 200 notifies the host 250 of the new file system. Once the new file system is fully initialized and all tables and structures have been rebuilt, the dual FS manager 236 can send updated file system metadata via the PHY manager 220 back to the host 250. The information can include the newly configured partition table, FSID, cluster allocation details, and any other file system specific information that the host 250 will need to mount the DSD 200 under the new file system. At block 624, the host 250 detects and mounts the new file system. The host 250 can use the updated metadata to attempt mounting the new file system. If the switch was successful, the host 250 should be able to detect and mount the DSD 200 under the new file system. The DSD 200 can continue operating under the newly activated file system without requiring user intervention. This can ensure uninterrupted access to data. At block 626, the DSD 200 continues normal operation. With the file system switch complete, the DSD 200 can resume normal operations under the new file system. All read and write operations now can function according to the rules of the newly active file system (e.g., FAT32, exFAT, NTFS, etc.). The DSD 200 can remain available to the host 250 and continue to function with the switched file system until further file system modifications are needed. The process 600 ends at block 628.

Figure 7B:
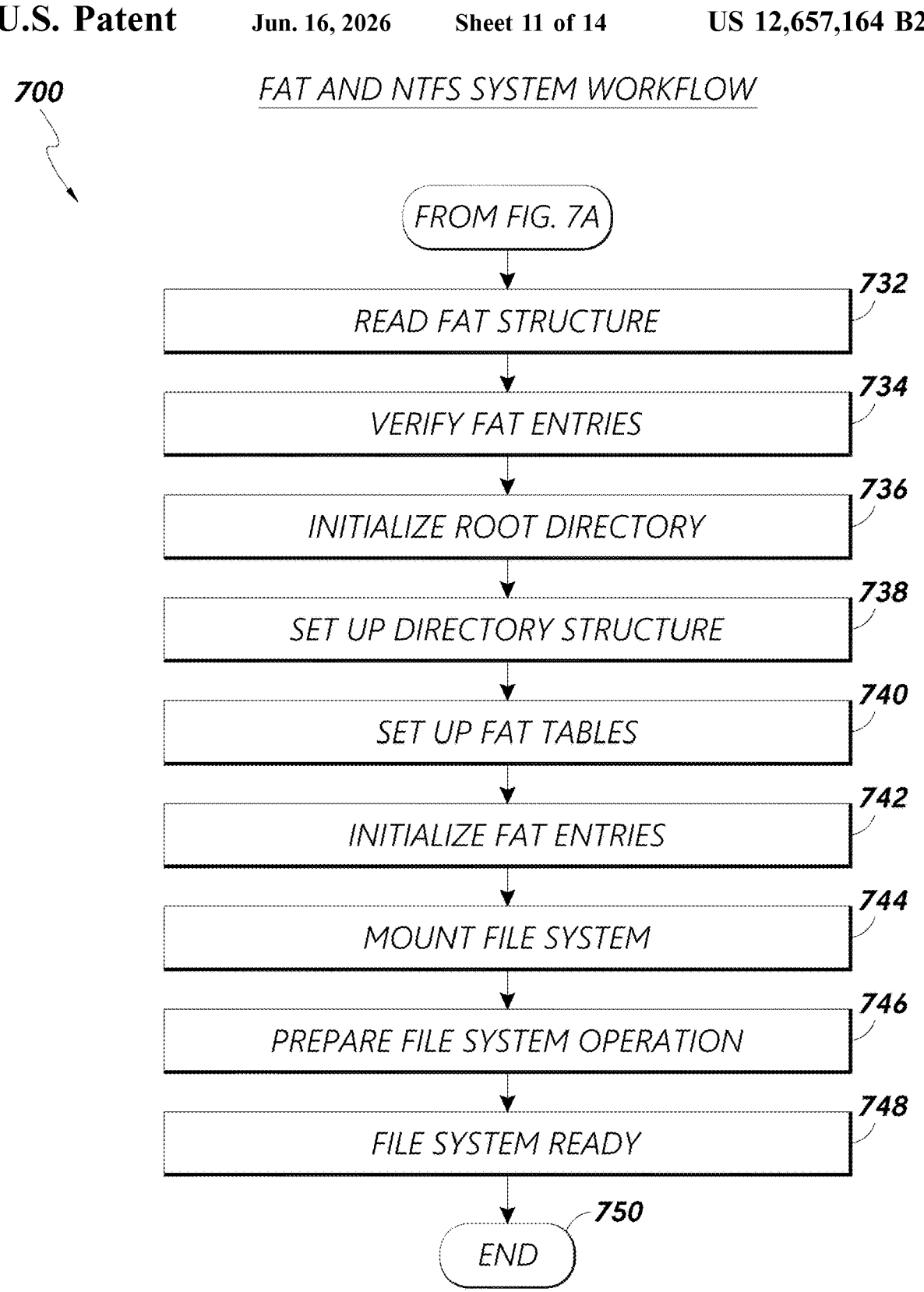
Figure 7C:
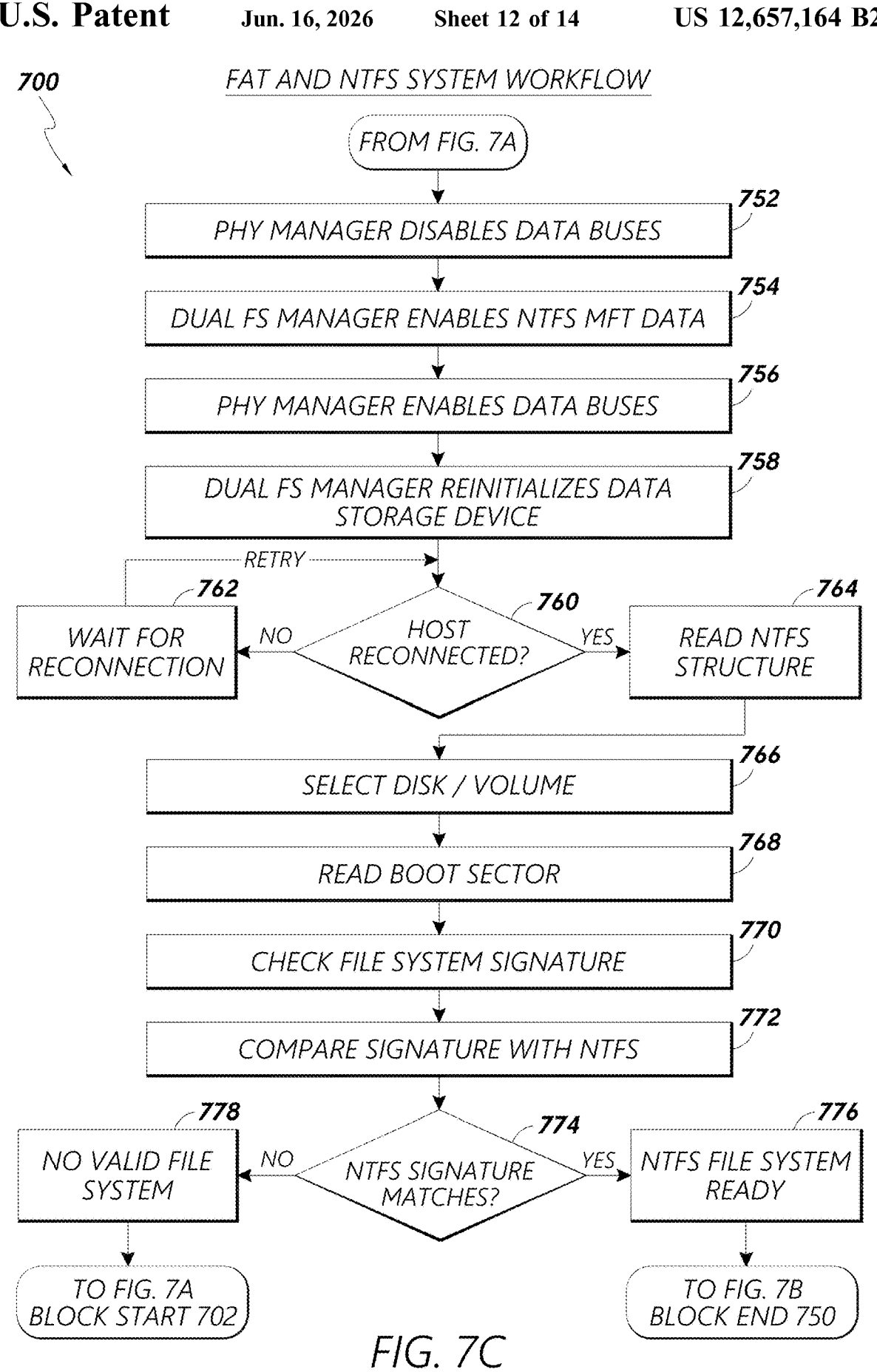

FIGS. 7A-7C illustrates a workflow process 700 for FAT and NTFS systems in a data storage device configured to provide a dual file system, according to one or more embodiments. The workflow process 700 may be implemented by a data storage device, such as a data storage device 100, 200 in FIGS. 1-2A. For example, the workflow process 700 may be performed in part or in whole by a data storage device or one of its components, such as control circuitry, a processor, or a dual file system manager 110. For illustrative purposes, the process 700 is explained below in connection with the data storage device 200 and the host 250 in FIG. 2A. Certain details relating to the process 700 are explained in more detail with respect to FIGS. 1-6. Depending on the embodiment, the process 700 may include fewer or additional blocks, and the blocks may be performed in an order that is different from illustrated.

The process 700 starts at block 702. The process 700 can use the USB interface. At block 704, the DSD 200 is initialized. At block 706, the DSD 200 powers up. At block 708, the DSD 200 determines whether the DSD 200 is ready. If the DSD 200 is not ready at block 708, the process 700 proceeds block 710. At block 710, the DSD 200 checks readiness and waits. The process 700 returns to block 706.

If the DSD 200 is ready at block 708, the process 700 proceeds to block 712. At block 712, the dual FS manager 236 enables FAT32 data. At block 714, the host 250 reads the boot sector. At block 716, the host 250 validates the boot sector. At block 718, the host 250 checks the boot sector signature. At block 720, the DSD 200 determines whether the FAT file system signature matches. If the FAT file system signature does not match at block 720, the process 700 continues to FIG. 7C.

If the FAT file system signature matches at block 720, the process 700 proceeds to block 722. At block 722, the host 250 reads the file system information. At block 724, the host 250 extracts the BPB information. At block 726, the DSD 200 verifies the file system parameters. At block 728, the DSD 200 reads the file system structure. At block 730, the DSD 200 determines whether the file system is the FAT file system. If the file system is not the FAT file system at block 730, the process 700 continues to FIG. 7C. If the file system is the FAT file system at block 730, the process 700 continues to FIG. 7B.

In FIG. 7B, the process 700 continues at block 732. At block 732, the DSD 200 reads the FAT structure. At block 734, the DSD 200 verifies the FAT entries. At block 736, the DSD 200 initializes the root directory. At block 738, the DSD 200 sets up the directory structure. At block 740, the DSD 200 sets up the FAT tables. At block 742, the DSD 200 initializes the FAT entries. At block 744, the DSD 200 mounts the file system. At block 746, the DSD 200 prepares the file system operation. At block 748, the file system is ready. The process 700 ends at block 750.

In FIG. 7C, the process 700 continues at block 752. At block 752, the PHY manager 220 disables data buses. At block 754, the dual FS manager 236 enables NTFS MFT data. At block 756, the PHY manager 220 enables data buses. At block 758, the dual FS manager 236 reinitializes the DSD 200. At block 760, the DSD 200 determines whether the host 250 is reconnected. If the host 250 is not reconnected at block 760, the process 700 proceeds to block 762. At block 762, the DSD 200 waits for reconnection. The process 700 returns to block 760.

If the host 250 is reconnected at block 760, the process 700 proceeds to block 764. At block 764, the DSD 200 reads the NTFS structure. At block 766, the DSD 200 selects the disk/volume. At block 768, the DSD 200 reads the boot sector. At block 770, the DSD 200 checks the file system signature. At block 772, the DSD 200 compares the signature with the NTFS. At block 774, the DSD 200 determines whether the signature matches with the NTFS signature. If the NTFS signature does not match at block 774, the process 700 proceeds to block 778. At block 778, the DSD 200 determines that there is no valid file system. The process 700 returns to block 702 in FIG. 7A. If the NTFS signature matches at block 774, the process 700 proceeds to block 776.

At block 776, the DSD 200 determines that the NTFS file system is ready. The process 700 ends at block 750 in FIG. 7B.

In the example of FIGS. 7A-7C, the DSD 200 checks for FAT first, then NTFS, but the DSD 200 may check first for NTFS, then FAT in other embodiments. The DSD 200 may also check for other file system types and in different orders. Many variations are possible.

In this manner, a data storage device configured to provide a dual file system can support and manage multiple file systems within the data storage device to enable compatibility with hosts supporting various file systems. For instance, regardless of whether a host supports FAT32 or NTFS, the host will be able to access data on the data storage device providing a dual file system. Accordingly, a host would not need to format the data storage device to use a file system the host supports, and the dual file system architecture can reduce or prevent inconvenience of changing file systems or formatting when switching hosts. In many cases, a data storage device may function as a slave device that waits for host commands to perform operations. The data storage device providing a dual file system can have intelligence within the data storage device to manage multiple file system formats and thereby reduce the overhead of the host, and a single data storage device can be compatible with many hosts.

FIG. 8 illustrates a workflow process 800 for providing a dual file system in a data storage device, according to one or more embodiments. The workflow process 800 may be implemented by a data storage device, such as a data storage device 100, 200 in FIGS. 1-2A. For example, the workflow process 800 may be performed in part or in whole by a data storage device or one of its components, such as control circuitry, a processor, or a dual file system manager 110. For illustrative purposes, the process 800 is explained below in connection with the data storage device 200 in FIG. 2A. Certain details relating to the process 800 are explained in more detail with respect to FIGS. 1-7. Depending on the embodiment, the process 800 may include fewer or additional blocks, and the blocks may be performed in an order that is different from illustrated.

At block 802, the data storage device 200 can support both a first file system and a second file system to access data stored on a non-volatile memory of the DSD 200. In some embodiments, the first file system is a New Technology File System (NTFS) file system, and the second file system is a File Allocation Table 32 (FAT32) file system. The DSD 200 can generate the one or more file system tables for the first file system and generate the one or more file system tables for the second file system. The one or more file system tables for the first file system and the one or more file system tables for the second file system can be stored in separate sections or partitions.

In certain embodiments, the DSD 200 can format the DSD 200 to support the first file system, where the first file system is supported by the host, and convert the one or more file system tables for the first file system to the one or more file system tables for the second file system. In some embodiments, the DSD 200 can initialize the DSD 200 to use the first file system, and in response to determining that the first file system is not supported by the host, automatically switch and reinitialize the DSD 200 to use the second file system. For instance, the DSD 200 can disable data buses, switch from the first file system to the second file system and reinitialize the data storage device to use the second file system, and enable the data buses. The DSD 200 can store information relating to a host and a file system associated with the host.

At block 804, the DSD 200 can determine a file system supported by a host. At block 806, the DSD 200 can receive a read request for data from the host. At block 808, the DSD 200 can, in response to determining that the file system supported by the host is the first file system, access one or more file system tables for the first file system to provide the data for the read request. At block 810, the DSD 200 can, in response to determining that the file system supported by the host is the second file system, access one or more file system tables for the second file system to provide the data for the read request.

In some embodiments, the DSD 200 can receive a write request to write data from the host. The DSD 200 can generate one or more entries for the one or more file system tables for the first file system relating to the data associated with the write request, where the first file system is supported by the host. The DSD 200 can generate one or more entries for the one or more file system tables for the second file system relating to the data associated with the write request.

In certain embodiments, the first file system and the second file system can include one or more of: a New Technology File System (NTFS), a File Allocation Table (FAT) file system, a File Allocation Table 32 (FAT32) file system, an Extended File Allocation Table (ExFAT) file system, an Apple File System (APFS), or an Extended File System (Ext).

Example Data Storage Device and Host System

Figure 9:
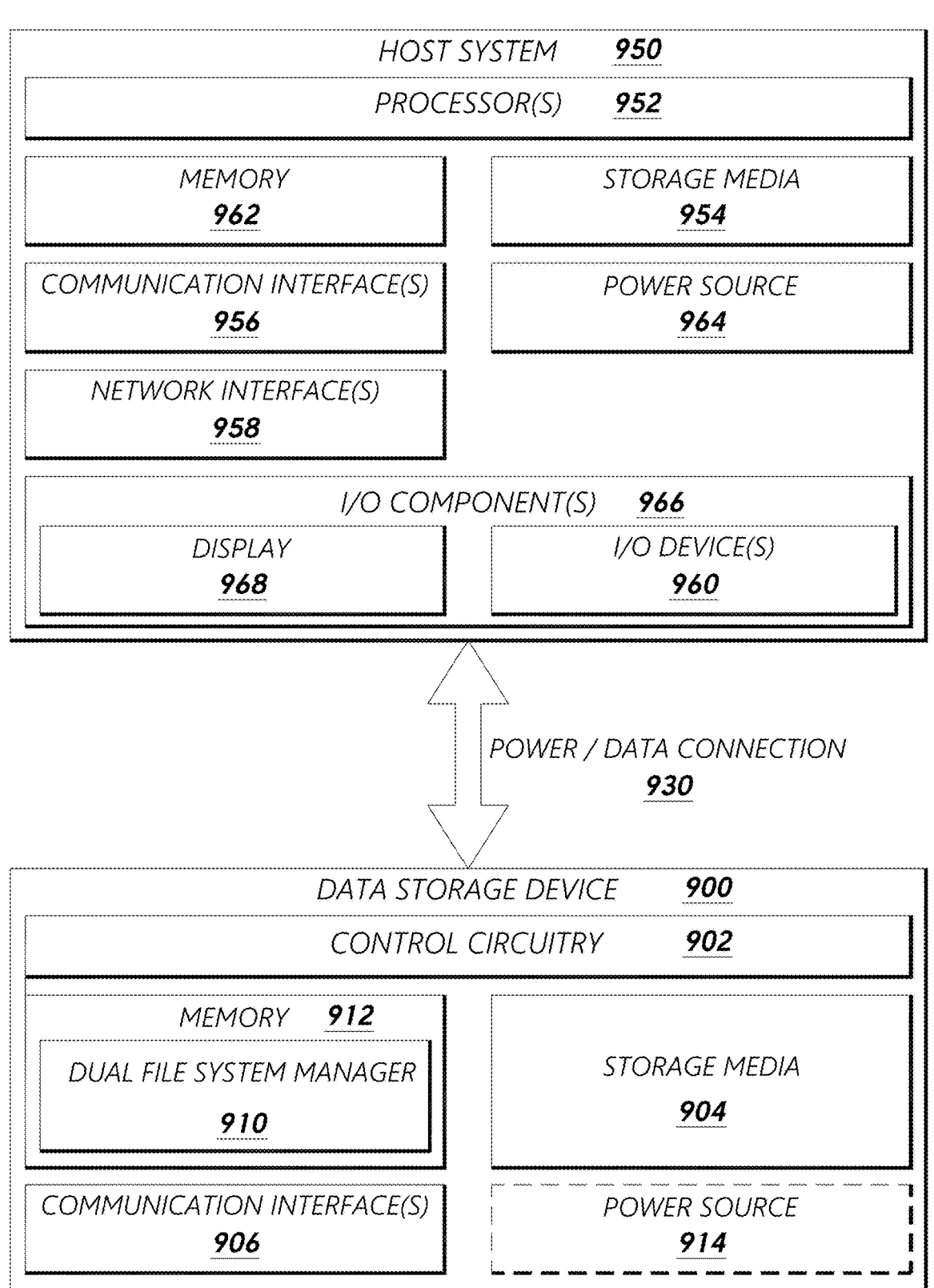
FIG. 9 illustrates a block diagram providing example details of a data storage device and a host system, according to certain embodiments.

FIG. 9 illustrates example details of a data storage device 900 and a host system 950, according to certain embodiments. As illustrated, the host system 950 can include one or more of the following components, devices, modules, and/or units (referred to herein as "components"), either separately/individually and/or in combination/collectively: one or more processors 952, such as central processing units (CPUs) or other type of processor, memory 962, one or more communication interfaces 956, one or more network interfaces 958, a power source 964 (e.g., battery or power supply unit), and/or one or more I/O components 966.

In some embodiments, the host system 950 can comprise a housing/enclosure configured and/or dimensioned to house or contain at least part of one or more of the components of the host system 950. In some embodiments, the storage media 954 may be housed internally in the enclosure of the host system 950. For example, the host system 950 may be a server or desktop system in case or rack mount enclosure with one or more storage drives in the case or enclosure. The host system 950 may be in a first enclosure, while the data storage device 900 may be external to the host system, being in a second enclosure different from the first enclosure.

The memory 962 can employ a variety of storage technologies and/or form factors and can include various types of volatile memory, such as Random Access Memory (RAM). RAM is a type of computer memory that serves as a temporary storage area for data and instructions that are actively being used by a computer's operating system, applications, and processes. RAM is volatile memory, meaning that its contents are lost when the computer is powered off or restarted. RAM provides fast and temporary access to data, enabling the processor 952 to quickly retrieve and manipulate the information it needs to perform tasks. The memory 962 can include programs that are running on the host system 950. The memory 962 may include a program, driver, browser extension, or the like that runs on a processor of the host system 950.

In addition, the host system 950 may also include non-volatile memory or storage media 954 for permanently storing data, such as important files. The storage media 954 may be an internal storage drive, such as an SSD, SSHD, or HDD. A permanent copy of any program can be stored in the storage media 954 and then copied to the memory 962 for running the program.

The one or more communication interfaces 956 can be a data interface that includes connectors, cables, and/or protocols for connection, communication, and/or power supply between host systems and the data storage device 900. In some embodiments, a port of the data interface can enable transfer of both data and power to connected devices. In some embodiments, the data interface comprises USB hardware and/or software. Various versions of USB can be used, such as USB 2.x, USB 3.x, or USB 4.x. The data interface can include a physical port for coupling with connectors and cables. Various types of USB ports can be included on the data storage device 900, such as male or female Type A, Type B, Type C, mini, and/or micro connectors. Other data interface standards can also be used, such as external SATA (eSATA), ExpressCard, FireWire (IEEE 1364), and Thunderbolt. The data interface can include a port for connecting with a cable and/or a corresponding port on the data storage device 900, forming a power/data connection 930 with the data storage device 900.

The power source 964 can be configured to provide/manage power for the host system 950. The power source 964 can comprise one or more devices and/or circuitry configured to provide a source of power and/or provide power management functionality. Moreover, in some embodiments the power source 964 includes a mains power connector that is configured to couple to an alternating current (AC) or direct current (DC) mains power source. In some embodiments, the power source can include one or more batteries, such as a lithium-based battery, a lead-acid battery, an alkaline battery, and/or another type of battery.

The one or more I/O components 966 can include a variety of components to receive input and/or provide output. The one or more I/O components 966 can be configured to receive touch, speech, gesture, biometric data, or any other type of input. For example, the one or more I/O components 966 can be used to provide input regarding control of the host system 950, such as opening files, entering logins, plays, and/or changing settings. As shown, the one or more I/O components 966 can include a display 968 configured to display data and various user interfaces. The display 968 can include one or more liquid-crystal displays (LCD), light-emitting diode (LED) displays, organic LED displays, plasma displays, electronic paper displays, and/or any other type(s) of technology. In some embodiments, the display 968 can include one or more touchscreens configured to receive input and/or display data. Further, the one or more I/O components 966 can include the one or more input/output devices 960, which can include a touchscreen, touch pad, controller, mouse, keyboard, wearable device (e.g., optical head-mounted display), virtual or augmented reality device (e.g., head-mounted display), etc.

As illustrated, the data storage device 900 can include one or more of the following components, devices, modules, and/or units (referred to herein as "components"), either separately/individually and/or in combination/collectively: control circuitry 902, storage media 904, communication interfaces 906, memory 912, and/or optionally a power source 914 (e.g., battery or power supply unit). In some embodiments, the data storage device 900 can comprise a housing/enclosure configured and/or dimensioned to house or contain the components of the data storage device 900. In some examples, the data storage device 900 does not have its own power source but receives power only from the host system 950 via the power/data connection 930.

The data storage device 900 may be an external storage drive, SD card, flash drive, or a USB memory stick that uses semiconductor memory as the storage media. For example, the data storage device 900 may be an external drive that is connected to the host system 950 via an external port, such as USB. In other examples, the data storage device 900 may be an SD card, a microSD card, or another type of flash card that is readable from a memory reader of the host system 950. In other implementations, the data storage device 900 may be an external storage drive that uses an HDD that uses magnetic disks as the storage media, an SSHD that uses a combination of semiconductor memory and magnetic disk technology, or a tape drive that uses tape media.

Although certain components of the data storage device 900 and host system 950 are illustrated in FIG. 9, it should be understood that additional components not shown can be included in embodiments in accordance with the present disclosure. Furthermore, certain of the illustrated components can be omitted in some embodiments. Although the control circuitry 902 is illustrated as a separate component, it should be understood that any or all of the remaining components of the data storage device 900 can be embodied at least in part in the control circuitry 902. That is, the control circuitry 902 can include various devices (active and/or passive), semiconductor materials and/or areas, layers, regions, and/or portions thereof, conductors, leads, vias, connections, and/or the like, wherein one or more of the other components of the data storage device 900 and/or portion(s) thereof can be formed and/or embodied at least in part in/by such circuitry components/devices.

The various components of the data storage device 900 can be electrically and/or communicatively coupled using certain connectivity circuitry/devices/features, which can or may not be part of the control circuitry 902. For example, the connectivity feature(s) can include one or more printed circuit boards configured to facilitate mounting and/or interconnectivity of at least some of the various components/circuitry of the data storage device 900. In some embodiments, two or more of the control circuitry 902, the storage media 904, the communication interface(s) 906, the memory 912, and/or the power source 914, can be electrically and/or communicatively coupled to each other.

The control circuitry 902 can include hardware and/or software (e.g., firmware) for providing a dual file system, such as a dual file system manager 910. The dual file system manager 910 may be implemented in firmware, which may be run on a controller chip. In some implementations, the dual file system manager 910 may be a specialized, hardware-based chip for providing a dual file system. The dual file system manager 910 may be implemented as one or more components or one or more modules.

The storage media 904 can utilize various types of non-volatile memory (NVM) to permanently store data. NVM is a type of computer memory that can retain stored information even after power is removed. For example, the storage media 904 can include one or more magnetic disks and/or semiconductor memory. The semiconductor memory can include any of various memory technologies, such as NAND memory and its variations like SLC, eMLC (Enterprise Multi Level Cell), MLC, TLC, and QLC. New types of emerging non-volatile memory could also be used such as Program in Place or Storage Class Memory (SCM) such as ReRam, Phase-Change Memory (PCM), and Magnetoresistive Random-Access Memory (MRAM).

The one or more communication interfaces 906 can be configured to communicate with one or more device/sensors/systems. For example, the one or more communication interfaces 906 can send/receive data over a network. A network in accordance with embodiments of the present disclosure can include a local area network (LAN), wide area network (WAN) (e.g., the Internet), personal area network (PAN), body area network (BAN), etc.

The one or more communication interfaces 906 can be a data interface that includes connectors, cables, and/or protocols for connection, communication, and/or power supply between the host system 950 and the data storage device 900. In some embodiments, a port of the data interface can enable transfer of both data and power to connected devices. In some embodiments, the data interface comprises USB hardware and/or software. Various versions of USB can be used, such as USB 2.x, USB 3.x, or USB 4.x. The data interface can include a physical port for coupling with connectors and cables. Various types of USB ports can be included on the data storage device 900, such as male or female Type A, Type B, Type C, mini, and/or micro connectors. Other data interface standards can also be used, such as external SATA (eSATA), ExpressCard, FireWire (IEEE 1364), and Thunderbolt. The data interface can include a port for connecting with a cable and/or a corresponding port on the host system 950, forming the power/ data connection 930.

The optional power source 914 can be configured to provide/manage power for the data storage device 900. In some embodiments, the power source can include one or more batteries, such as a lithium-based battery, a lead-acid battery, an alkaline battery, and/or another type of battery. In some embodiments the power source 914 includes a mains power connector that is configured to couple to an alternating current (AC) or direct current (DC) mains power source. However, in some embodiments, the data storage device 900 may not include an internal power source but be configured to receive power through the communication interface 906, such as via a USB connection.

The term "control circuitry" is used herein according to its broad and ordinary meaning, and can refer to any collection of one or more processors, processing circuitry, processing modules/units, chips, dies (e.g., semiconductor dies including one or more active and/or passive devices and/or connectivity circuitry), microprocessors, micro-controllers, digital signal processors, microcomputers, central processing units, graphics processing units, field programmable gate arrays, programmable logic devices, state machines (e.g., hardware state machines), logic circuitry, analog circuitry, digital circuitry, and/or any device that manipulates signals (analog and/or digital) based on hard coding of the circuitry and/or operational instructions. They may be configured to work individually or in combination. Control circuitry can further comprise one or more data storage devices, which can be embodied in a single memory device, a plurality of memory devices, and/or embedded circuitry of a device. Such data storage can comprise read-only memory, random access memory, volatile memory, non-volatile memory, static memory, dynamic memory, flash memory, cache memory, data storage registers, and/or any device that stores digital information. It should be noted that in embodiments in which control circuitry comprises a hardware state machine (and/or implements a software state machine), analog circuitry, digital circuitry, and/or logic circuitry, data storage device(s)/register(s) storing any associated operational instructions can be embedded within, or external to, the circuitry comprising the state machine, analog circuitry, digital circuitry, and/or logic circuitry.

The term "memory" is used herein according to its broad and ordinary meaning and can refer to any suitable or desirable type of computer-readable media. For example, computer-readable media can include one or more volatile data storage devices, non-volatile data storage devices, removable data storage devices, and/or nonremovable data storage devices implemented using any technology, layout, and/or data structure(s)/protocol, including any suitable or desirable computer-readable instructions, data structures, program modules, or other types of data.

Computer-readable media that can be implemented in accordance with embodiments of the present disclosure includes, but is not limited to, phase change memory, static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic data storage devices, or any other non-transitory medium that can be used to store information for access by a computing device. As used in certain contexts herein, computer-readable media may not generally include communication media, such as modulated data signals and carrier waves. As such, computer-readable media should generally be understood to refer to non-transitory media.

Additional Embodiments

Those skilled in the art will appreciate that in some embodiments, other types of data storage devices can be implemented while remaining within the scope of the present disclosure. In addition, the actual steps taken in the processes discussed herein may differ from those described or shown in the figures. Depending on the embodiment, certain of the steps described above may be removed, others may be added, and the order may be rearranged.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer data storage device or collection of data storage devices. Some or all of the methods may alternatively be embodied in specialized computer hardware.

What is claimed is:

1. A data storage device comprising:
a non-volatile memory; and
control circuitry configured to:
support both a first file system within the data storage device and a second file system within the data storage device to access data stored on the non-volatile memory, wherein the first file system is a New Technology File System (NTFS) file system and the second file system is a File Allocation Table 32 (FAT32) file system, wherein the control circuitry comprises a dual file system (FS) manager that creates a NTFS master file table (MFT) table and starts journaling automatically based on a FAT32 table when a host formatted file system is a FAT file system, and wherein the dual FS manager creates FAT32 tables based on the NTFS MFT table when the host formatted file system is an NTFS file system;
determine a file system supported by a host;
receive a read request for data from the host;
in response to determining that the file system supported by the host is the first file system, access one or more file system tables for the first file system to provide the data for the read request; and
in response to determining that the file system supported by the host is the second file system, access one or more file system tables for the second file system to provide the data for the read request.

2. The data storage device of claim 1, wherein the control circuitry is further configured to:
generate the one or more file system tables for the first file system; and
generate the one or more file system tables for the second file system.

3. The data storage device of claim 1, wherein the control circuitry is further configured to:
format the data storage device to support the first file system, wherein the first file system is supported by the host; and
convert the one or more file system tables for the first file system to the one or more file system tables for the second file system.

4. The data storage device of claim 1, wherein the control circuitry is further configured to:
initialize the data storage device to use the first file system; and
in response to determining that the first file system is not supported by the host, automatically switch and reinitialize the data storage device to use the second file system.

5. The data storage device of claim 4, wherein the control circuitry is further configured to:
disable data buses;
switch from the first file system to the second file system and reinitialize the data storage device to use the second file system; and
enable the data buses.

6. The data storage device of claim 1, wherein the control circuitry is further configured to:
receive a write request to write data from the host;
generate one or more entries for the one or more file system tables for the first file system relating to the data associated with the write request, wherein the first file system is supported by the host; and
generate one or more entries for the one or more file system tables for the second file system relating to the data associated with the write request.

7. The data storage device of claim 1, wherein the first file system and the second file system include one or more of: a New Technology File System (NTFS), a File Allocation Table (FAT) file system, a File Allocation Table 32 (FAT32) file system, an Extended File Allocation Table (ExFAT) file system, an Apple File System (APFS), or an Extended File System (Ext).

8. The data storage device of claim 1, wherein the one or more file system tables for the first file system and the one or more file system tables for the second file system are stored in separate sections or partitions.

9. The data storage device of claim 1, wherein the control circuitry is further configured to store information relating to a host and a file system associated with the host.

10. A method of providing a dual file system in a data storage device, the method comprising:
providing, by control circuitry of a data storage device, support both a first file system within the data storage device and a second file system within the data storage device to access data stored on a non-volatile memory of the data storage device, wherein the first file system and the second file system include one or more of: a New Technology File System (NTFS), a File Allocation Table (FAT) file system, a File Allocation Table 32 (FAT32) file system, an Extended File Allocation Table (ExFAT) file system, an Apple File System (APFS), or an Extended File System (Ext), wherein the first file system and the second file system are different file systems, wherein the control circuitry comprises a dual file system (FS) manager that creates a NTFS master file table (MFT) table and starts journaling automatically based on a FAT32 table when a host formatted file system is a FAT file system, and wherein the dual FS manager creates FAT32 tables based on the NTFS MFT table when the host formatted file system is an NTFS file system;
determining, by the control circuitry, a file system supported by a host;
receiving, by the control circuitry, a read request for data from the host;
in response to determining that the file system supported by the host is the first file system, by the control circuitry, accessing one or more file system tables for the first file system to provide the data for the read request; and
in response to determining that the file system supported by the host is the second file system, by the control circuitry, accessing one or more file system tables for the second file system to provide the data for the read request.

11. The method of claim 10, wherein the first file system is a New Technology File System (NTFS) file system and the second file system is a File Allocation Table 32 (FAT32) file system.

12. The method of claim 10, further comprising:

generating the one or more file system tables for the first file system; and generating the one or more file system tables for the second file system.

13. The method of claim 10, further comprising:

formatting the data storage device to support the first file system, wherein the first file system is supported by the host; and converting the one or more file system tables for the first file system to the one or more file system tables for the second file system.

14. The method of claim 10, further comprising:

initializing the data storage device to use the first file system; and in response to determining that the first file system is not supported by the host, automatically switching and reinitializing the data storage device to use the second file system.

15. The method of claim 14, further comprising:

disabling data buses;

switching from the first file system to the second file system and reinitializing the data storage device to use the second file system; and enabling the data buses.

16. The method of claim 10, further comprising:

receiving a write request to write data from the host;

generating one or more entries for the one or more file system tables for the first file system relating to the data associated with the write request, wherein the first file system is supported by the host; and generating one or more entries for the one or more file system tables for the second file system relating to the data associated with the write request.

17. The method of claim 10, wherein the one or more file system tables for the first file system and the one or more file system tables for the second file system are stored in separate sections or partitions.

18. A data storage device comprising:

a non-volatile memory; and controller means configured to:

support both a first file system within the data storage device and a second file system within the data storage device to access data stored on the non-volatile memory, wherein the first file system is a New Technology File System (NTFS) file system and the second file system is a File Allocation Table 32 (FAT32) file system, wherein the controller means comprises a dual file system (FS) manager that creates a NTFS master file table (MFT) table and starts journaling automatically based on a FAT32 table when a host formatted file system is a FAT file system, and wherein the dual FS manager creates FAT32 tables based on the NTFS MFT table when the host formatted file system is an NTFS file system;

determine a file system supported by a host;

receive a read request for data from the host;

in response to determining that the file system supported by the host is the first file system, access one or more file system tables for the first file system to provide the data for the read request; and in response to determining that the file system supported by the host is the second file system, access one or more file system tables for the second file system to provide the data for the read request.

\* \* \* \* \*